(12) United States Patent  
Nomura

(10) Patent No.: US 8,970,968 B2  
(45) Date of Patent: Mar. 3, 2015

(54) PHOTOGRAPHING LENS SYSTEM

(75) Inventor: Yoichi Nomura, Tokyo (JP)

(73) Assignee: PENTAX Ricoh Imaging Company, Ltd., Tokyo (JP)

( * ) Notice: Subject to any disclaimer, the term of this patent is extended or adjusted under 35 U.S.C. 154(b) by 25 days.

(21) Appl. No.: 13/450,767

(22) Filed: Apr. 19, 2012

(65) Prior Publication Data

US 2012/0268834 A1    Oct. 25, 2012

(30) Foreign Application Priority Data

Apr. 22, 2011 (JP) ................. 2011-095966

(51) Int. Cl.
- G02B 15/14 (2006.01)
- G02B 15/173 (2006.01)
- G02B 13/18 (2006.01)

(52) U.S. Cl.
CPC ............. *G02B 15/173* (2013.01); *G02B 13/18* (2013.01)
USPC ........................................................ 359/691

(58) Field of Classification Search
CPC ............. G02B 15/173; G02B 13/0045; G02B 13/006; G02B 9/08; G02B 15/161
USPC .......... 359/770, 763, 740, 794, 691
See application file for complete search history.

(56) References Cited

U.S. PATENT DOCUMENTS

| 2,662,447 | A  | * | 12/1953 | Tronnier ........................ 359/740 |
| 6,532,342 | B2 | * | 3/2003  | Yoneyama ...................... 396/79 |
| 2009/0086340 | A1 |   | 4/2009  | Sato |
| 2010/0208366 | A1 |   | 8/2010  | Inoue |

FOREIGN PATENT DOCUMENTS

| JP | 05-45581     | 2/1993  |
| JP | 06-308385    | 11/1994 |
| JP | 2004-101880  | 4/2004  |
| JP | 2007-94173   | 4/2007  |
| JP | 2008-145586  | 6/2008  |
| JP | 2009-086221  | 4/2009  |
| JP | 2009-198855  | 9/2009  |
| JP | 2010-191069  | 9/2010  |

OTHER PUBLICATIONS

Japan Office action, dated Oct. 28, 2014 along with an english translation thereof.

* cited by examiner

*Primary Examiner* — Alicia M Harrington
(74) *Attorney, Agent, or Firm* — Greenblum & Bernstein P.L.C.

(57) ABSTRACT

A photographing lens system includes a positive front lens group, an aperture diaphragm, and a positive rear lens group, in that order from the object side. The front lens group includes at least one negative lens element, and at least two positive cemented lenses, in that order from the object side, and the following conditions are satisfied:

$$0.35 < fF/fR < 1.5 \quad (1),$$

and $$-1.4 < fL1/f < -0.9 \quad (2),$$

wherein fF and fR designate the focal lengths of the front lens group and the rear lens group, fL1 designates the combined focal length of the negative lens elements provided within said front lens group; and f designates the focal length of the entire photographing lens system.

10 Claims, 18 Drawing Sheets

FNO.=1:1.93

SPHERICAL
ABERRATION
CHROMATIC
ABERRATION

W=30.8°

LATERAL
CHROMATIC
ABERRATION

W=30.8°

ASTIGMATISM

W=30.8°

DISTORTION

Y= 0.00

Y= 2.32

Y= 3.26

Y= 4.65

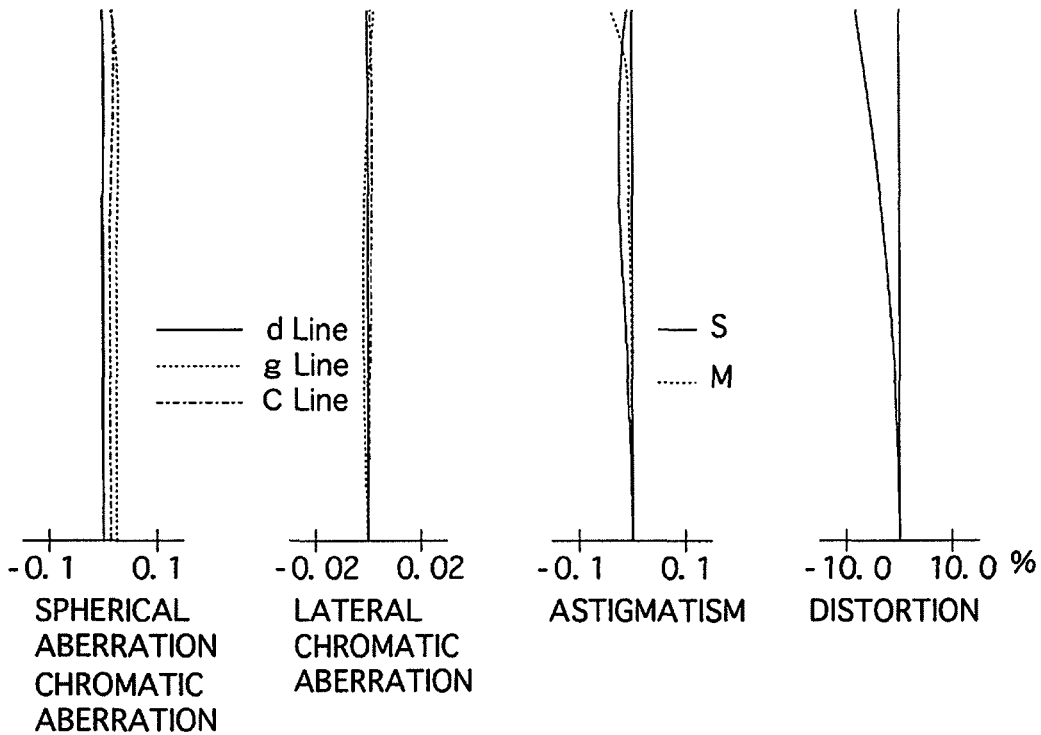
Fig. 5A  Fig. 5B  Fig. 5C  Fig. 5D
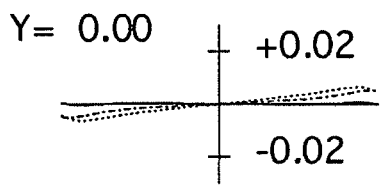
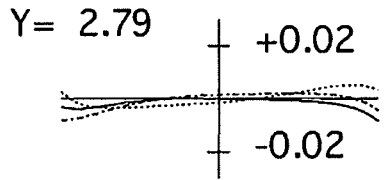
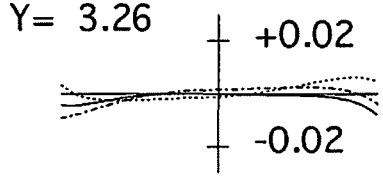
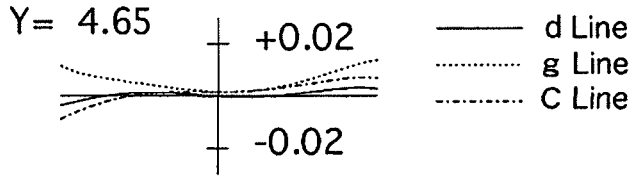

Fig. 8A  Fig. 8B  Fig. 8C  Fig. 8D
FNO.=1:1.93  W=30.7°  W=30.7°  W=30.7°
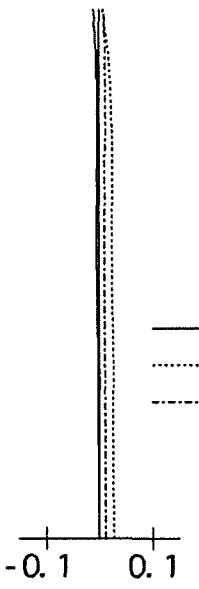
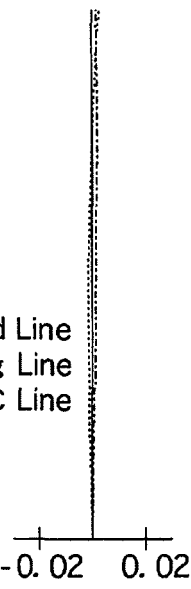
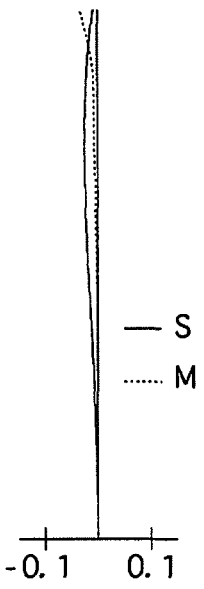
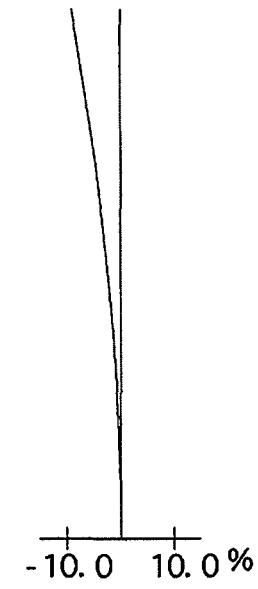
SPHERICAL ABERRATION CHROMATIC ABERRATION    LATERAL CHROMATIC ABERRATION    ASTIGMATISM    DISTORTION
Fig. 9A   Y= 0.00
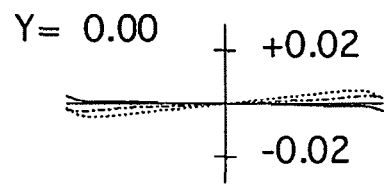
Fig. 9B   Y= 2.79
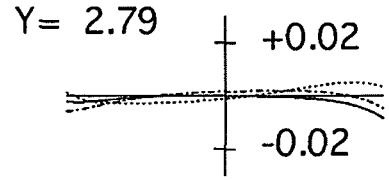
Fig. 9C   Y= 3.26
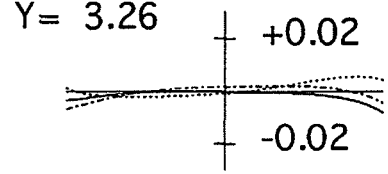
Fig. 9D   Y= 4.65
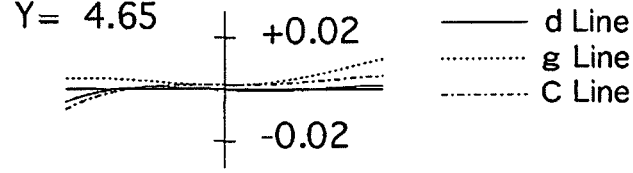

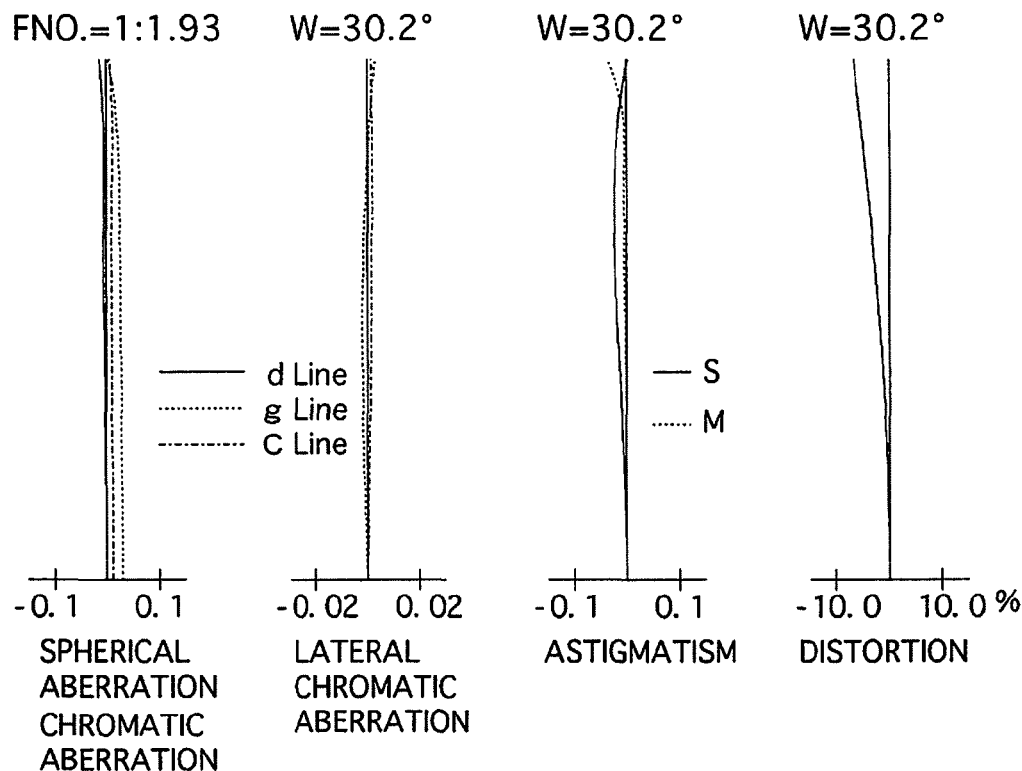

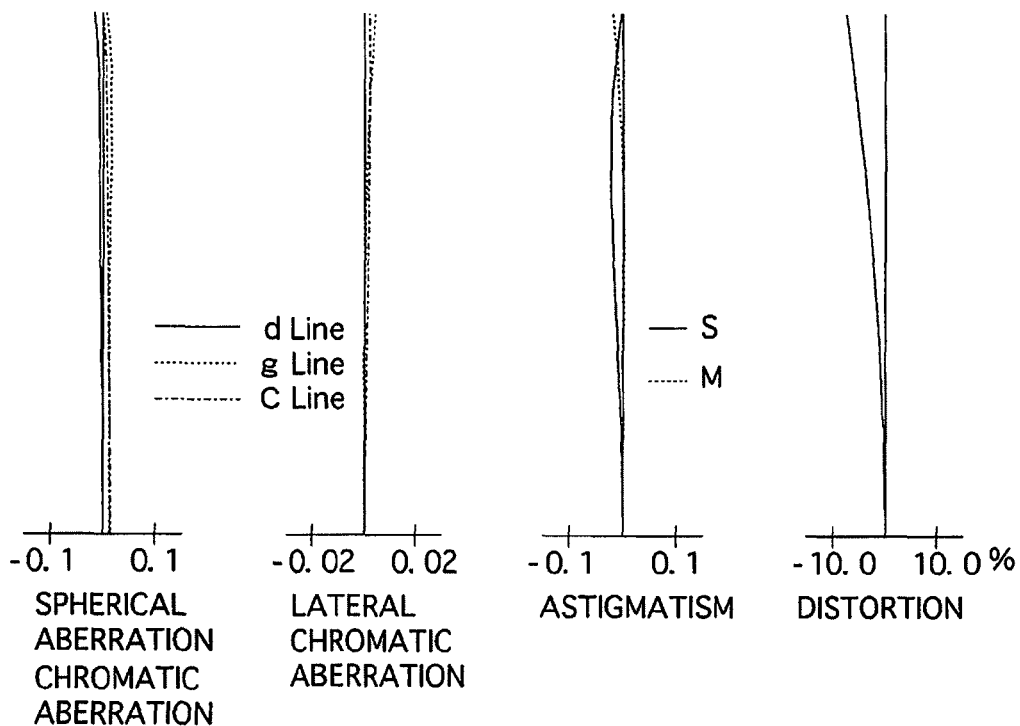
Fig. 17A FNO.=1:1.93 — SPHERICAL ABERRATION CHROMATIC ABERRATION
Fig. 17B W=30.6° — LATERAL CHROMATIC ABERRATION
Fig. 17C W=30.6° — ASTIGMATISM
Fig. 17D W=30.6° — DISTORTION
Fig. 18A  Y= 0.00 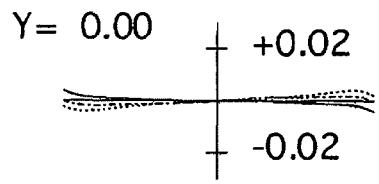
Fig. 18B  Y= 2.79 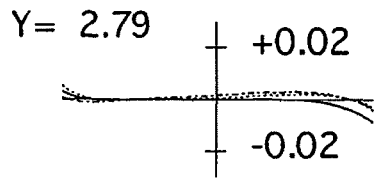
Fig. 18C  Y= 3.26 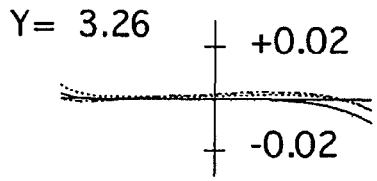
Fig. 18D  Y= 4.65 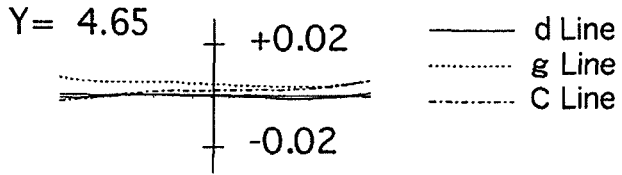

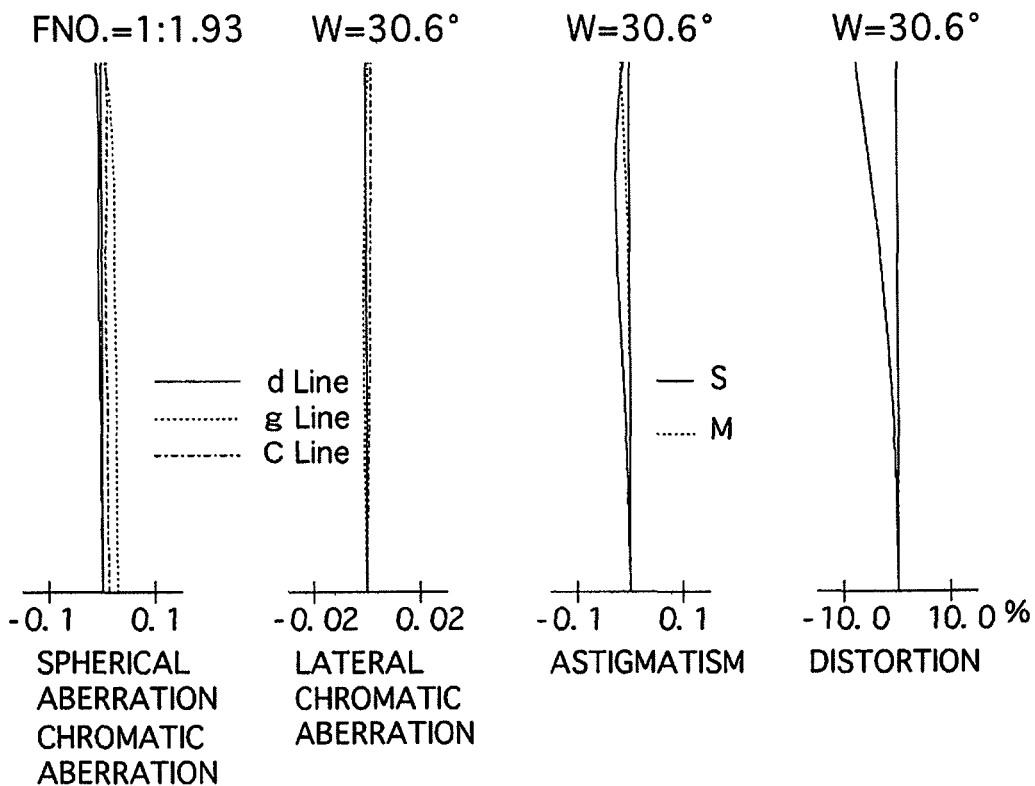
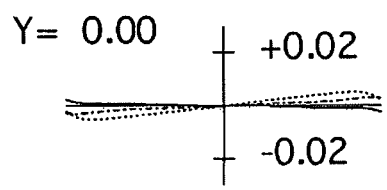
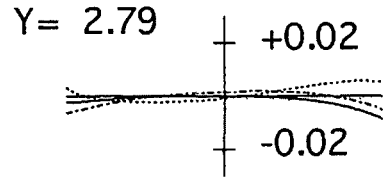
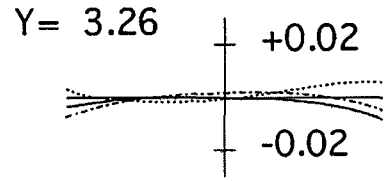
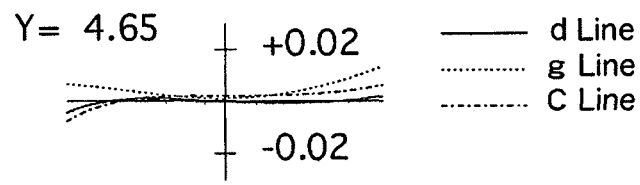

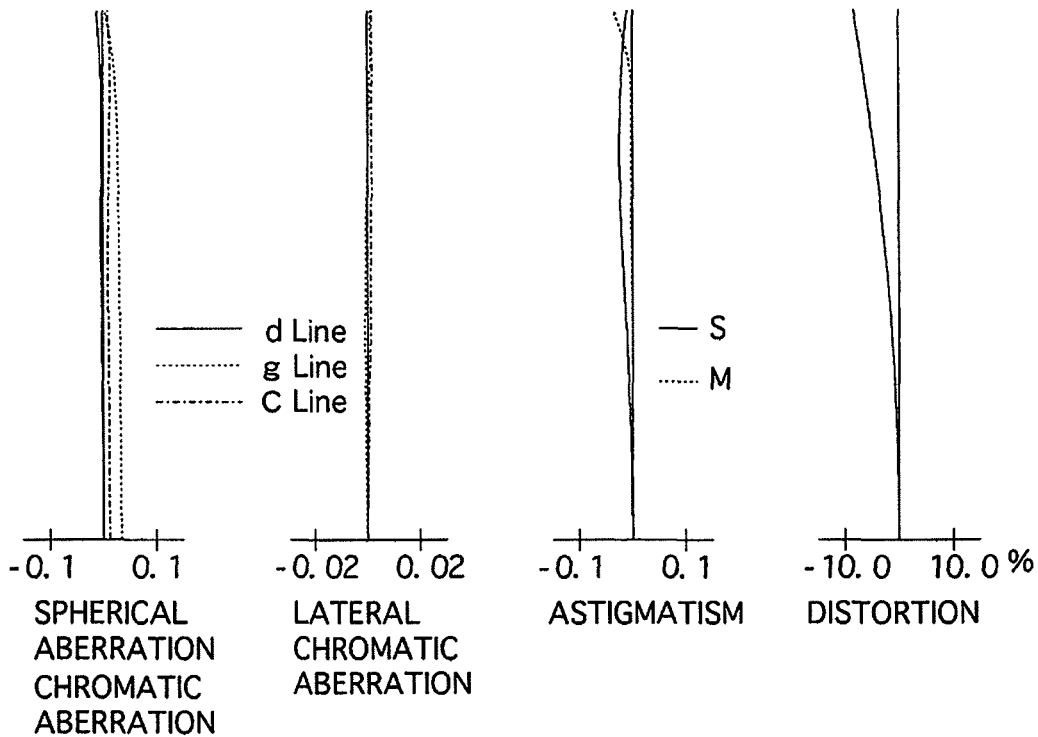
Fig. 26A FNO.=1:1.93 SPHERICAL ABERRATION CHROMATIC ABERRATION
Fig. 26B W=30.5° LATERAL CHROMATIC ABERRATION
Fig. 26C W=30.5° ASTIGMATISM
Fig. 26D W=30.5° DISTORTION
Fig. 27A Y= 0.00
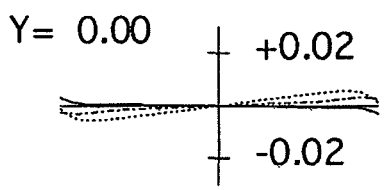
Fig. 27B Y= 2.79
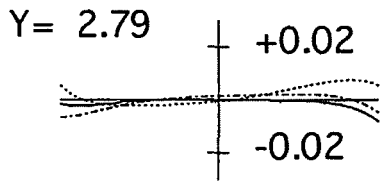
Fig. 27C Y= 3.26
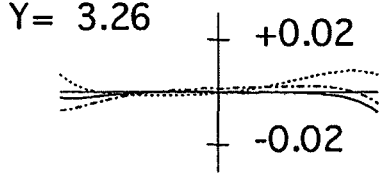
Fig. 27D Y= 4.65
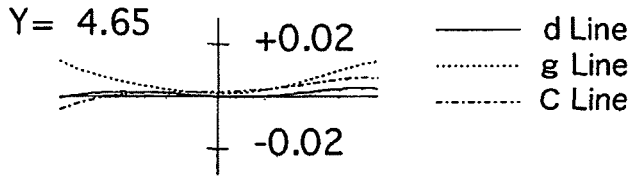

PHOTOGRAPHING LENS SYSTEM

BACKGROUND OF THE INVENTION

1. Field of the Invention

The present invention relates to a photographing lens system that is suitable for use in an imaging apparatus such as a digital camera, and especially for a 'mirrorless' interchangeable-lens camera in which no split mirror is provided for an optical finder.

2. Description of Related Art

In recent years there has been a demand for photographing lens systems used in an imaging apparatus such as a digital camera to be further miniaturization while having a high optical quality. Photographing lens systems which are configured of a positive front lens group and a positive rear lens group, in that order from the object side, are known in the art (see Japanese Unexamined Patent Publication Nos. 2009-86221, 2009-198855, 2010-191069 and 2004-101880). Since each of these photographing lens systems are for use in a single-lens reflex (SLR) camera, in order to avoid the split-mirror of the optical finder interfering with the photographing lens system between the photographing lens system and the imaging surface (of an image sensor), a negative lens element is typically provided closest to the object side within the front lens group in order to attain a long backfocus with respect to the focal length.

However, in the photographing lens system of Japanese Unexamined Patent Publication No. 2004-101880, since there area large number of lens elements, i.e., five lens elements, in the rear lens group, this becomes a cause of enlargement of the entire optical system. Furthermore, since a negative lens element is provided closest to the image side within the rear lens group so that the peripheral light rays are greatly diverged, spherical aberration, coma and astigmatism increase, and telecentricity is also lost.

In the photographing lens systems disclosed in Japanese Unexamined Patent Publication Nos. 2010-191069 and 2004-101880, since the refractive power balance between the front lens group and the rear lens group is unsuitable, large amounts of aberrations such as spherical aberration, coma and astigmatism occur, and the optical quality is deteriorated. For example, in the photographing lens system disclosed in Japanese Unexamined Patent Publication No. 2010-191069, the refractive power of the rear lens group is too strong compared to that of the front lens group, so that astigmatism occurs. In the photographing lens system disclosed in Japanese Unexamined Patent Publication No. 2004-101880, the refractive power of the front lens group is too strong compared to that of the rear lens group, so that large amounts of spherical aberration and coma occur.

Furthermore, in each of the photographing lens systems disclosed in the above-mentioned Japanese Unexamined Patent Publication Nos. 2009-86221, 2009-198855, 2010-191069 and 2004-101880, the backfocus (the distance from the imaging surface (imaging plane) to the surface on the image side of the lens element provided closest to the image side of the photographing lens system) is too long, and if utilized in a mirrorless interchangeable-lens camera, the photographing lens system becomes undesirably large. On the other hand, in a photographing lens system that is used in a mirrorless interchangeable-lens camera, since it is necessary to attain a certain amount of length between the imaging surface (imaging plane) and the surface of the negative lens element provided closest to the image side within the photographing lens system in order to reduce the sharpness of any images of dust, etc., that may have adhered to the lens element provided closest to the image side when the interchanging of the lens (barrel) while achieving miniaturization, it is not a matter of merely reducing the backfocus to an excessive degree.

SUMMARY OF THE INVENTION

The present invention has been devised in view of the above discussed problems, and provides a photographing lens system that is miniaturized, has a superior optical quality in which various aberrations such as astigmatism, spherical aberration and coma, etc., are favorably corrected, and is suitable for use in a mirrorless interchangeable-lens camera.

According to an aspect of the present invention, a photographing lens system is provided, including a positive front lens group, an aperture diaphragm, and a positive rear lens group, in that order from the object side. The front lens group includes at least one negative lens element, and at least two positive cemented lenses, in that order from the object side, and the following conditions (1) and (2) are satisfied:

$$0.35 < fF/fR < 1.5 \qquad (1),$$

and $$-1.4 < fL1/f < -0.9 \qquad (2),$$

wherein fF designates the focal length of the front lens group; fR designates the focal length of the rear lens group; fL1 designates the combined focal length of the at least one negative lens element provided within the front lens group; and f designates the focal length of the entire the photographing lens system.

It is desirable for the rear lens group to include a negative cemented lens and a positive lens element, in that order from the object side.

It is desirable for the negative cemented lens which is provided within the rear lens group to include a negative lens element and a positive lens element, in that order from the object side, and for the following condition (3) to be satisfied:

$$|vd6 - vd7| > 20 \qquad (3),$$

wherein vd6 designates the Abbe number with respect to the d-line of the negative lens element of the negative cemented lens which is provided within the rear lens group; and vd7 designates the Abbe number with respect to the d-line of the positive lens element of the negative cemented lens which is provided within the rear lens group.

It is desirable for a positive lens element which is provided closest to the image side within the rear lens group to include a focusing lens group which is moved along the optical axis direction during a focusing operation.

It is desirable for the following condition (4) to be satisfied:

$$vd8 > 40 \qquad (4),$$

wherein vd8 designates the Abbe number with respect to the d-line of the positive lens element which is provided closest to the image side within the rear lens group.

It is desirable for the front lens group to include a negative lens element having a concave surface on the image side, and two positive cemented lenses, in that order from the object side.

It is desirable for the cemented lens that is provided on the object side within the front lens group to include a negative lens element having a concave surface on the object side and a positive lens element, in that order from the object side.

It is desirable for the cemented lens provided on the image side within the front lens group to include a positive lens element having a convex surface on the object side and a negative lens element having a concave surface on the image side, in that order from the object side.

In an embodiment, a photographing lens system is provided, including a positive front lens group, an aperture diaphragm, and a positive rear lens group, in that order from the object side. The front lens group includes one negative lens element and two positive cemented lenses, in that order from the object side. The rear lens group including a negative cemented lens and one positive lens element, in that order from the object side.

According to the present invention, a photographing lens system can be achieved that is miniaturized, has a superior optical quality in which various aberrations such as astigmatism, spherical aberration and coma, etc., are favorably corrected, and that is suitable for use in a mirrorless interchangeable-lens camera.

The present disclosure relates to subject matter contained in Japanese Patent Application No. 2011-95966 (filed on Apr. 22, 2011) which is expressly incorporated herein in its entirety.

BRIEF DESCRIPTION OF THE DRAWINGS

The present invention will be discussed below in detail with reference to the accompanying drawings, in which:

FIGS. 5A, 5B, 5C and 5D show various aberrations that occurred in the lens arrangement shown in FIG. 4;

FIGS. 6A, 6B, 6C and 6D show lateral aberrations that occurred in the lens arrangement shown in FIG. 4;

FIGS. 8A, 8B, 8C and 8D show various aberrations that occurred in the lens arrangement shown in FIG. 7;

FIGS. 9A, 9B, 9C and 9D show lateral aberrations that occurred in the lens arrangement shown in FIG. 7;

FIGS. 14A, 14B, 14C and 14D show various aberrations that occurred in the lens arrangement shown in FIG. 13;

FIGS. 15A, 15B, 15C and 15D show lateral aberrations that occurred in the lens arrangement shown in FIG. 13;

FIGS. 17A, 17B, 17C and 17D show various aberrations that occurred in the lens arrangement shown in FIG. 16;

FIGS. 18A, 18B, 18C and 18D show lateral aberrations that occurred in the lens arrangement shown in FIG. 16;

FIGS. 20A, 20B, 20C and 20D show various aberrations that occurred in the lens arrangement shown in FIG. 19;

FIGS. 21A, 21B, 21C and 21D show lateral aberrations that occurred in the lens arrangement shown in FIG. 19;

FIGS. 26A, 26B, 26C and 26D show various aberrations that occurred in the lens arrangement shown in FIG. 25; and FIGS. 27A, 27B, 27C and 27D show lateral aberrations that occurred in the lens arrangement shown in FIG. 25.

DESCRIPTION OF THE EMBODIMENTS

Figure 1:
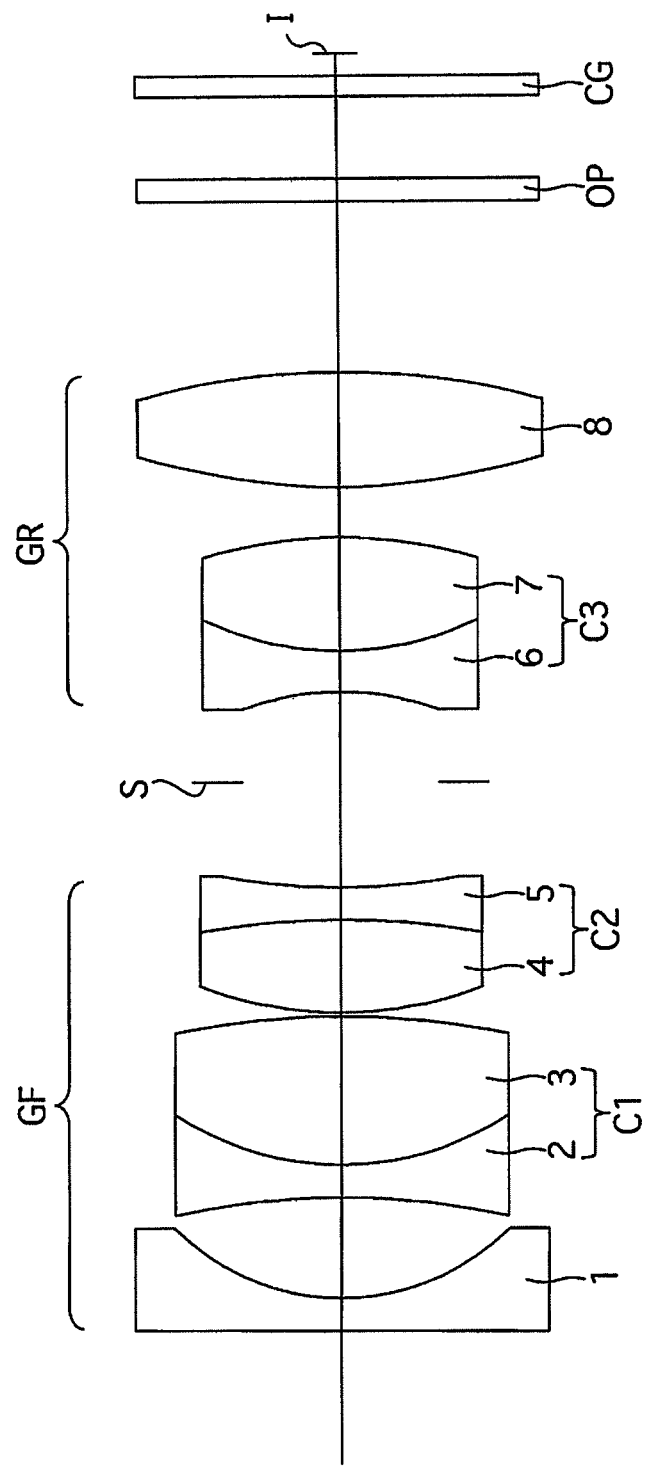
FIG. 1 shows a lens arrangement of a first numerical embodiment of a photographing lens system, according to the present invention, when focused on an object at infinity.
Figure 2A:
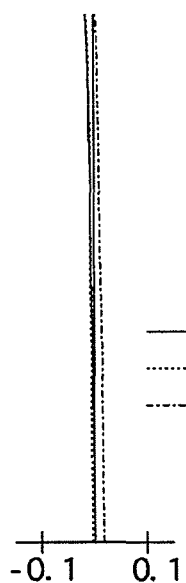
FIGS. 2A, 2B, 2C and 2D show various aberrations that occurred in the lens arrangement shown in FIG. 1.
Figure 2B:
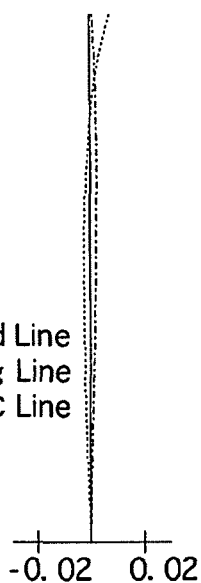
Figure 2C:
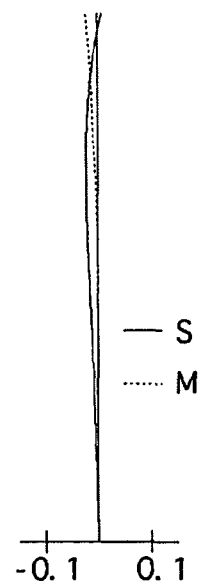
Figure 2D:
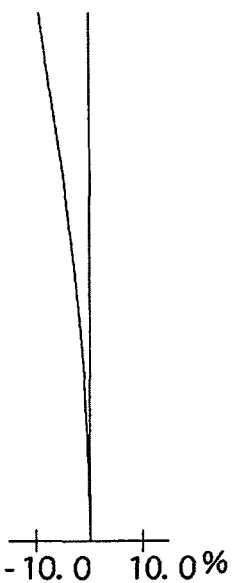
Figure 3A:
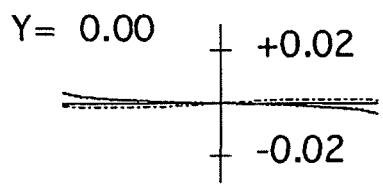
FIGS. 3A, 3B, 3C and 3D show lateral aberrations that occurred in the lens arrangement shown in FIG. 1.
Figure 3B:
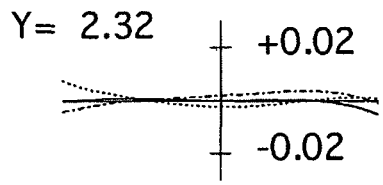
Figure 3C:
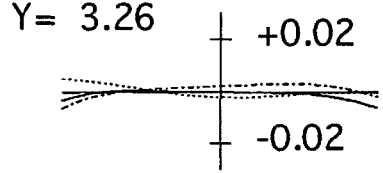
Figure 3D:
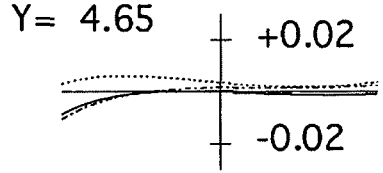

The photographing lens system of the present invention, as shown in the first through ninth numerical embodiments of FIG. 1, FIG. 4, FIG. 7, FIG. 10, FIG. 13, FIG. 16, FIG. 19, FIG. 22 and FIG. 25, respectively, is configured of a positive front lens group GF, an aperture diaphragm S, and a positive rear lens group GR, in that order from the object side. "I" designates the imaging surface (imaging plane).

In each of the first through ninth numerical embodiments, the front lens group GF is configured of a negative lens element (a negative lens element having a concave surface on the image side) 1, and two positive cemented lenses C1 and C2, in that order from the object side.

The negative lens element (negative lens element having a concave surface on the image side) 1 is either a negative meniscus lens element having a convex surface on the object side (first, fifth, and seventh through ninth numerical embodiments), a biconcave negative lens element (second, fourth and sixth numerical embodiments), or a planoconcave negative lens element having a concave surface on the image side (third numerical embodiment).

In each of the first through ninth numerical embodiments, the cemented lens C1 on the object side (with in the front lens group GF) is configured of a biconcave negative lens element (negative lens element having a concave surface on the object side) 2, and a biconvex positive lens element 3, in that order from the object side.

In each of the first through ninth numerical embodiments, the cemented lens C2 on the image side (with in the front lens group GF) is configured of a biconvex positive lens element (positive lens element having a convex surface on the object side) 4, and a biconcave negative lens element (negative lens element having a concave surface on the image side) 5, in that order from the object side.

In each of the first through ninth numerical embodiments, the rear lens group GR is configured of a negative cemented lens C3 and a positive lens element 8, in that order from the object side.

In each of the first through ninth numerical embodiments, the cemented lens C3 is configured of a biconcave negative lens element 6 and a biconvex positive lens element 7, in that order from the object side. An aspherical surface is provided on the image side of the biconvex positive lens element 7.

In each of the first through ninth numerical embodiments, the positive lens element 8 is configured of a biconvex positive lens element, and has an aspherical surface on each side thereof. The biconvex positive lens element 8 constitutes a focusing lens group that is moved along the optical axis direction (the biconvex positive lens element 8 advances toward the object side to carry out a focusing operation to focus on an object at infinity through to an object at a finite distance).

An optical filter OP and a cover glass CG are positioned in between the rear lens group (the positive lens element 8) and the imaging plane I and are provided in the camera body (not shown).

In the illustrated embodiments, the term "backfocus" designates a distance between the imaging plane I and the surface on the image side of the positive lens element 8 that is closest to the image side within the rear lens group GR. Furthermore, the negative lens element 1 which is provided closest to the object side within the front lens group GF has a role of providing a sufficient backfocus, and due the negative lens element 1, the two positive cemented lenses C1 and C2 which are provided on the image side of the negative lens element 1 have a role of correcting chromatic aberration.

It is possible to divide the negative lens element 1 which is provided closest to the object side within the front lens group GF into two or more negative lens elements while maintaining the above-mentioned roles of providing a sufficient backfocus and of correcting chromatic aberration.

In order to miniaturize a photographing optical system, it is necessary to strengthen the refractive power of the positive front lens group. However, if the refractive power of the negative lens element 1 that provided closest to the object side is strengthened in order to also appropriately provide a sufficient backfocus, a large amount of negative distortion occurs at the negative lens element 1. Therefore, according to the present invention, by including the positive lens elements 3 and 4, which are relative thick compared to the negative lens elements 2 and 5, in the cemented lenses C1 and C2 that are provided on the object side of the diaphragm S, the negative distortion that occurs at the negative lens element 1 can be favorably corrected.

By configuring the negative lens element 2 of the cemented lens C1 (on the object side of the diaphragm S) to have a concave surface on the object side, astigmatism can be favorably corrected. By configuring the positive lens element 3 of the cemented lens C2 (on the object side of the diaphragm S) to have a convex surface on the object side, spherical aberration and coma can be favorably corrected.

In the illustrated embodiments, the negative lens element 6 provided within the rear lens group GR has a role of generating negative spherical aberration in order to correct spherical aberration that occurs in the entire photographing optical system while maintaining a minimal influence on the abaxial aberrations. In addition, the positive lens elements 7 and 8 within the rear lens group GR has a role of suppressing the occurrence of spherical aberration and coma.

In order to favorably correct high order spherical aberration, the negative lens element 6 and the positive lens element 7 within the rear lens group GR are provided as the cemented lens C3. Furthermore, in order to further correct various aberrations in a favorable manner with only a small number of lens elements, an aspherical surface is formed on the image side of the positive lens element 7 of the cemented lens C3; this aspherical surface has a decreasing positive refractive power compared to the paraxial spherical surface from the optical axis toward the outer periphery thereof.

Condition (1) specifies the ratio of the focal length of the front lens group GF to the focal length of the rear lens group GR. By satisfying condition (1), the photographing optical system can be miniaturized while favorably correcting spherical aberration, coma and distortion, thereby achieving a superior optical quality.

If the upper limit of condition (1) is exceeded, the refractive power of the rear lens group GR becomes too strong compared to the refractive power of the front lens group GF, so that a large amount of distortion occurs. Moreover, in order to correct such distortion, it becomes necessary to increase the number of lens elements, thereby increasing the size (the length in the optical axis direction) of the photographing optical system.

If the lower limit of condition (1) is exceeded, although advantageous in regard to miniaturization of the photographing optical system, the refractive power of the front lens group GF becomes too strong with respect to the refractive power of the rear lens group GR, so that a large amount of spherical aberration and coma occur.

Condition (2) specifies the ratio of the focal length of the negative lens element 1 that is provided closest to the object side within the front lens group GF (or the combined focal length thereof in the case where the negative lens element 1 is divided into two or more negative lens elements) to the focal length of the entire photographing optical system. By satisfying condition (2), the photographing optical system can be miniaturized while favorably correcting astigmatism and distortion.

If the upper limit of condition (2) is exceeded, the refractive power of the negative lens element 1 provided closest to the object side within the front lens group GF becomes too strong, so that it becomes difficult to attain both miniaturization and correction of negative distortion.

If the lower limit of condition (2) is exceeded, the refractive power of the negative lens element closest to the object side within the front lens group GF becomes too weak, so that in order to attain a sufficient backfocus, it becomes necessary to increase the length of the entire photographing optical system in order to diverge the light rays, so that it becomes difficult to achieve miniaturization while also correcting astigmatism.

As described above, the negative lens element 1 that is provided closest to the object side within the front lens group GF has a role of attaining a sufficient backfocus when the photographing optical system is installed in a lens barrel. According to the illustrated embodiments, by specifying the refractive power of the negative lens element 1 that is provided closest to the object side within the front lens group GF within a range that satisfies condition (2), the photographing optical system can be miniaturized while attaining a sufficient backfocus, so that even if dust, etc., adheres to the image side of the surface of the positive lens element 8, any images of such dust can be prevented from being sharply imaged on the photographing image.

If the upper limit condition (2) is exceeded, the refractive power of the negative lens element 1 provided closest to the object side within the front lens group GF becomes too weak, so that due to the backfocus becoming too large (long), the photographing optical system increases in size (in the optical axis direction).

If the lower limit of condition (2) is exceeded, the refractive power of the negative lens element 1 that is provided closest to the object side within the front lens group GF becomes too strong, so that since the backfocus becomes too small, if dust, etc., adheres to the image side of the surface of the positive lens element 8, images of such dust is sharply imaged on the photographing image, thereby deteriorating the photographing image quality.

As described above, the negative cemented lens C3 that is provided within the rear lens group GR is configured of the negative lens element 6 and the positive lens element 7, in that order from the object side. Condition (3) specifies, with respect to the above-described arrangement, the difference in Abbe number with respect to the d-line between the negative lens element 6 and the positive lens element 7. By satisfying condition (3), chromatic aberration that cannot be completely corrected by the front lens group GF can be further corrected in a favorable manner.

If the lower limit of condition (3) is exceeded, the difference in Abbe number with respect to the d-line between the negative lens element 6 and the positive lens element 7 cannot be sufficiently achieved, so that chromatic aberration may still remain.

In the rear lens group GR, since the abaxial light rays pass at a high position with respect to the optical axis in order to maintain telecentricity, if the entire rear lens group GR is used as a focusing lens group, this becomes a cause of an increase in size and weight of the photographing optical system, which in turn hinders miniaturization of the focusing mechanism and hinders a rapid focusing operation. Therefore, in the illustrated embodiments, by using the positive lens element (positive single lens element) 8 that is provided closest to the image side within the rear lens group GR as the focusing lens group, a miniaturized focusing mechanism and a rapid focusing operation can be achieved.

Whereas, in an arrangement in which the entire optical system (photographing optical system) is advanced forward in order to carry out a focusing operation, since the entire optical system is advanced forward, the weight of the focusing lens group is large, and the motor/actuator (s) of the focusing mechanism are large. Accordingly, the maximum diameter of the lens barrel becomes large, so that it becomes difficult to miniaturize the photographing optical system.

In the aforementioned Japanese Unexamined Patent Publication Nos. 2009-86221 and 2009-198855, since the front lens group and the rear lens group are moved (along the optical axis direction) separately in order to perform a focusing operation, the lens frame configuration for (movably) controlling the focusing lens group becomes complicated and large in size. Furthermore, since the number of lens elements is large, the burden on the motor for driving the focusing lens group is great, so that a rapid focusing operation cannot be attained.

In the aforementioned Japanese Unexamined Patent Publication No. 2010-191069, since only one lens group is used to carry out a focusing operation, the lens frame configuration thereof is relatively simple compared to those of the aforementioned Japanese Unexamined Patent Publication Nos. 2009-86221 and 2009-198855. However, since the number of lens elements is large, the burden on the motor for driving the focusing lens group is great, so that a rapid focusing operation cannot be attained.

In the illustrated embodiments, in order to favorably correct spherical aberration, coma and astigmatism during a focusing operation, the positive lens element (focusing lens group) 8 has an aspherical surface on at least one side thereof, in which this aspherical surface(s) has a decreasing positive refractive power compared to the paraxial spherical surface from the optical axis toward the outer periphery thereof. It is of course preferable for the positive lens element (focusing lens group) 8 to have the above-described aspherical surface on both sides thereof.

Condition (4) specifies the Abbe number with respect to the d-line of the positive lens element 8. By satisfying condition (4), axial aberration and lateral chromatic aberration can be favorably corrected (the fluctuation in the chromatic aberrations that occur during a focusing operation can be suppressed).

If the lower limit of condition (4) is exceeded, it becomes difficult to correct the axial chromatic aberrations and the lateral chromatic aberrations.

Furthermore, the photographing lens system of the illustrated embodiments is configured of a positive front lens group GF, an aperture diaphragm S, and a positive rear lens group GR, in that order from the object side. The front lens group GF is configured of the single negative lens element 1, and the two positive cemented lenses C1 (lens elements 2 and 3) and C2 (lens elements 4 and 5), in that order from the object side; each lens element of the front lens group GF has a substantive refractive power. The rear lens group GR is configured of the negative cemented lens C3 (lens elements 6 and 7) and the single positive lens element 8, in that order from the object side; each lens element of the rear lens group GR has a substantive refractive power.

This lens arrangement constitutes the fundamental configuration having a minimum number of lens element for achieving a favorable photographing lens system for use in a mirrorless interchangeable-lens camera while having a superior optical quality by favorably correcting various aberrations such as astigmatism, spherical aberration and coma, while also achieving miniaturization of the entire photographing lens system.

In other words, by specifying the above-described fundamental configuration (the front lens group GF configured of the five lens elements 1 through 5, the aperture diaphragm S, and the rear lens group GR configured of the three lens elements 6 through 8) as an imperative configuration for achieving the present invention, the photographing lens system according to the present invention can favorably correct various aberrations such as astigmatism, spherical aberration and coma with a minimal number of lens elements.

Furthermore, by making this fundamental configuration imperative, a dramatic improvement in further miniaturization of the photographing lens system compared to those of the aforementioned Japanese Unexamined Patent Publication Nos. 2009-86221, 2009-198855, 2010-191069 and 2004-101880, and a desirable backfocus can be achieved, so that even if dust, etc., that may have adhered to the image side of the positive lens element 8, any images of such dust can be prevented from being sharply imaged on the photographing image.

EMBODIMENTS

Specific first through ninth numerical embodiments will be herein discussed. In the various aberration diagrams, lateral aberration diagrams and the tables, the d-line, g-line and C-line show aberrations at their respective wave-lengths; S designates the sagittal image, M designates the meridional image, FNO. designates the f-number, f designates the focal length of the entire optical system, W designates the half angle of view (°), Y designates the image height, dB designates the distance from the imaging surface (imaging plane) to the surface on the image side of the lens element provided closest to the image side of the photographing lens system (backfocus), L designates the overall length of the lens system, R designates the radius of curvature, d designates the lens thickness or distance between lenses, N(d) designates the refractive index at the d-line, and vd designates the Abbe number with respect to the d-line. The unit used for the various lengths is defined in millimeters (mm).

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

FIGS. 1 through 3D and Tables 1 through 3 show a first numerical embodiment of a photographing lens system according to the present invention. FIG. 1 shows a lens arrangement of the first numerical embodiment of the zoom lens system when focused on an object at infinity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. Table 1 shows the lens surface data, Table 2 shows the aspherical surface data, and Table 3 shows various data of the photographing lens system according to the first numerical embodiment of the present invention.

The photographing lens system of the first numerical embodiment is configured of a positive front lens group GF, an aperture diaphragm S and a positive rear lens group GR, in that order from the object side.

The front lens group GF is configured of a negative lens element (negative lens element having a concave surface on the image side) 1, and two positive cemented lenses C1 and C2, in that order from the object side.

The negative lens element 1 is a negative meniscus lens element having a convex surface on the object side.

The cemented lens C1 on the object side is configured of a biconcave negative lens element (negative lens element having a concave surface on the object side) 2 and a biconvex positive lens element 3, in that order from the object side.

The cemented lens C2 on the image side is configured of a biconvex positive lens element (positive lens element having a convex surface on the object side) 4 and a biconcave negative lens element (negative lens element having a concave surface on the image side) 5, in that order from the object side.

The rear lens group GR is configured of a negative cemented lens C3 and a positive lens element 8, in that order from the object side.

The cemented lens C3 is configured of a biconcave negative lens element 6 and a biconvex positive lens element 7, in that order from the object side. The biconvex positive lens element 7 has an aspherical surface on the image side thereof.

The positive lens element 8 is a biconvex positive lens element and has an aspherical surface on each side thereof. Furthermore, the biconvex positive lens element 8 is a focusing lens group which is moved along the optical axis during a focusing operation (the biconvex positive lens element 8 is advanced toward the object side when focusing on an object at infinity to an object at a finite distance).

An optical filter OP and a cover glass CG which are positioned behind (in between the imaging plane and) the rear lens group GR (positive lens element 8) and are provided in a camera body (not shown).

TABLE 1

SURFACE DATA

| Surf. No. | r | d | N(d) | v(d) |
|---|---|---|---|---|
| 1 | 1072.616 | 0.800 | 1.51680 | 64.2 |
| 2 | 5.896 | 2.461 | | |
| 3 | −19.039 | 0.800 | 1.59551 | 39.2 |
| 4 | 7.534 | 3.646 | 1.88300 | 40.8 |
| 5 | −20.795 | 0.100 | | |
| 6 | 9.939 | 2.278 | 1.77250 | 49.6 |
| 7 | −19.654 | 0.800 | 1.58144 | 40.9 |
| 8 | 16.145 | 2.572 | | |
| 9(Diaphragm) | ∞ | 2.205 | | |
| 10 | −6.986 | 1.000 | 1.76182 | 26.6 |
| 11 | 7.766 | 2.792 | 1.75501 | 51.2 |
| 12* | −11.214 | 1.232 | | |
| 13* | 14.507 | 2.818 | 1.80610 | 40.7 |
| 14* | −21.008 | 4.194 | | |
| 15 | ∞ | 0.550 | 1.51680 | 64.2 |
| 16 | ∞ | 2.020 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 2

Aspherical Surface Data

| Surf. No. | K | A4 | A6 | A8 |
|---|---|---|---|---|
| 12 | 0.000 | 0.5422E−04 | 0.9393E−05 | 0.1579E−07 |
| 13 | 0.000 | −0.2804E−03 | 0.1077E−05 | 0.5386E−07 |
| 14 | 0.000 | −0.1145E−03 | −0.3647E−05 | 0.1262E−06 |

TABLE 3

PHOTOGRAPHING LENS SYSTEM DATA

| | |
|---|---|
| FNO. | 1.9 |
| f | 8.5 |
| W | 30.8 |
| Y | 4.65 |
| dB | 0.53 |
| L | 31.30 |

Numerical Embodiment 2

Figure 4:
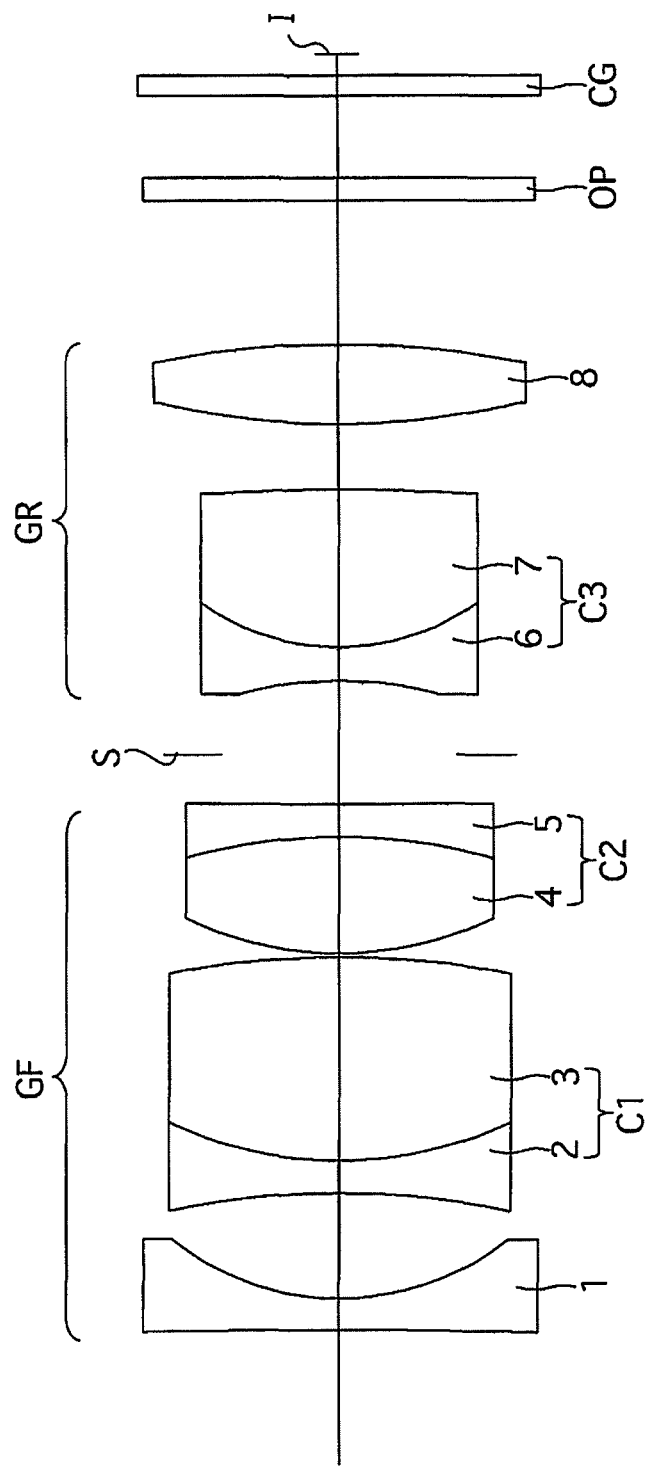
FIG. 4 shows a lens arrangement of a second numerical embodiment of a photographing lens system, according to the present invention, when focused on an object at infinity.

FIGS. 4 through 6D and Tables 4 through 6 show a second numerical embodiment of a photographing lens system according to the present invention. FIG. 4 shows a lens arrangement of the second numerical embodiment of the zoom lens system when focused on an object at infinity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. Table 4 shows the lens surface data, Table 5 shows the aspherical surface data, and Table 6 shows various data of the photographing lens system according to the second numerical embodiment of the present invention.

The fundamental lens arrangement of the second numerical embodiment is the same as that of the first numerical embodiment except the negative lens element (the negative lens element having a concave surface on the image side) 1 is a biconcave negative lens element.

TABLE 4

| Surf. No. | r | d | N(d) | ν(d) |
|---|---|---|---|---|
| 1 | −267.683 | 0.800 | 1.69680 | 55.5 |
| 2 | 6.686 | 2.574 | | |
| 3 | −20.119 | 0.800 | 1.59551 | 39.2 |
| 4 | 9.840 | 5.000 | 1.88300 | 40.8 |
| 5 | −22.603 | 0.100 | | |
| 6 | 8.746 | 2.869 | 1.77250 | 49.6 |
| 7 | −14.146 | 0.800 | 1.59551 | 39.2 |
| 8 | 179.564 | 1.230 | | |
| 9(Diaphragm) | ∞ | 1.800 | | |
| 10 | −9.165 | 0.828 | 1.76182 | 26.6 |
| 11 | 5.895 | 3.856 | 1.75501 | 51.2 |
| 12* | −30.522 | 1.600 | | |
| 13* | 17.583 | 1.964 | 1.80610 | 40.7 |
| 14* | −25.872 | 3.532 | | |
| 15 | ∞ | 0.550 | 1.51680 | 64.2 |
| 16 | ∞ | 2.020 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 5

Aspherical Surface Data

| Surf. No. | K | A4 | A6 | A8 |
|---|---|---|---|---|
| 12 | 0.000 | 0.3741E−03 | 0.2196E−04 | −0.1959E−06 |
| 13 | 0.000 | −0.2686E−03 | 0.6949E−05 | 0.9156E−07 |
| 14 | 0.000 | −0.1532E−03 | −0.1453E−05 | 0.2549E−06 |

TABLE 6

PHOTOGRAPHING LENS SYSTEM DATA

| FNO. | 1.9 |
|---|---|
| f | 8.5 |
| W | 30.5 |
| Y | 4.65 |
| dB | 0.53 |
| L | 31.35 |

Numerical Embodiment 3

Figure 7:
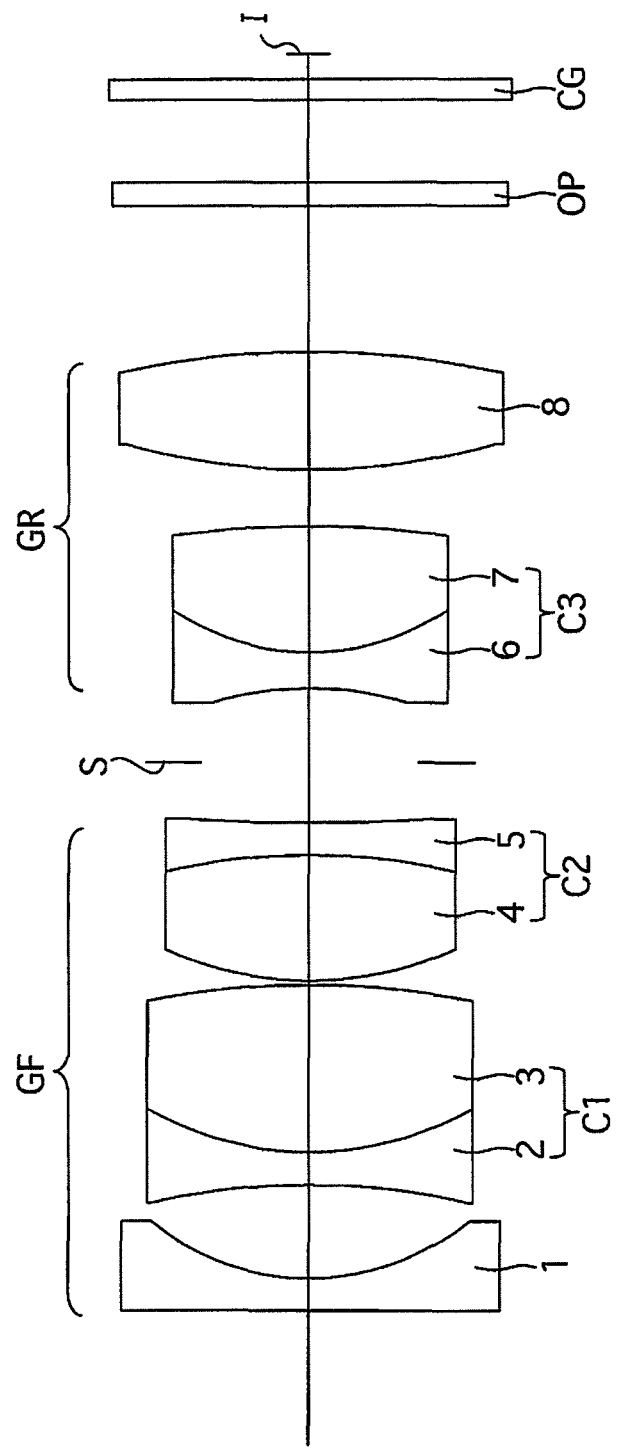
FIG. 7 shows a lens arrangement of a third numerical embodiment of a photographing lens system, according to the present invention, when focused on an object at infinity.

FIGS. 7 through 9D and Tables 7 through 9 show a third numerical embodiment of a photographing lens system according to the present invention. FIG. 7 shows a lens arrangement of the third numerical embodiment of the zoom lens system when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. Table 7 shows the lens surface data, Table 8 shows the aspherical surface data, and Table 9 shows various data of the photographing lens system according to the third numerical embodiment of the present invention.

The fundamental lens arrangement of the third numerical embodiment is the same as that of the first numerical embodiment except the negative lens element (the negative lens element having a concave surface on the image side) 1 is a planoconcave negative lens element having a concave surface on the image side.

TABLE 7

| Surf. No. | r | d | N(d) | ν(d) |
|---|---|---|---|---|
| 1 | ∞ | 0.800 | 1.69680 | 55.5 |
| 2 | 6.285 | 2.275 | | |
| 3 | −17.783 | 0.800 | 1.59551 | 39.2 |
| 4 | 8.130 | 4.102 | 1.88300 | 40.8 |
| 5 | −21.070 | 0.100 | | |
| 6 | 8.733 | 3.089 | 1.77250 | 49.6 |
| 7 | −16.024 | 0.800 | 1.59551 | 39.2 |
| 8 | 52.481 | 1.485 | | |
| 9(Diaphragm) | ∞ | 1.811 | | |
| 10 | −8.207 | 0.880 | 1.76182 | 26.6 |
| 11 | 6.072 | 3.115 | 1.75501 | 51.2 |
| 12* | −19.702 | 1.385 | | |
| 13* | 15.955 | 2.895 | 1.80610 | 40.7 |
| 14* | −22.945 | 3.601 | | |
| 15 | ∞ | 0.550 | 1.51680 | 64.2 |
| 16 | ∞ | 2.020 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 8

Aspherical Surface Data

| Surf. No. | K | A4 | A6 | A8 |
|---|---|---|---|---|
| 12 | 0.000 | 0.2862E−03 | 0.2036E−04 | −0.1228E−06 |
| 13 | 0.000 | −0.2531E−03 | 0.6753E−05 | 0.4319E−07 |
| 14 | 0.000 | −0.1068E−03 | −0.1795E−05 | 0.2020E−06 |

TABLE 9

PHOTOGRAPHING LENS SYSTEM DATA

| FNO. | 1.9 |
|---|---|
| f | 8.5 |
| W | 30.7 |
| Y | 4.65 |
| dB | 0.53 |
| L | 30.74 |

Numerical Embodiment 4

Figure 10:
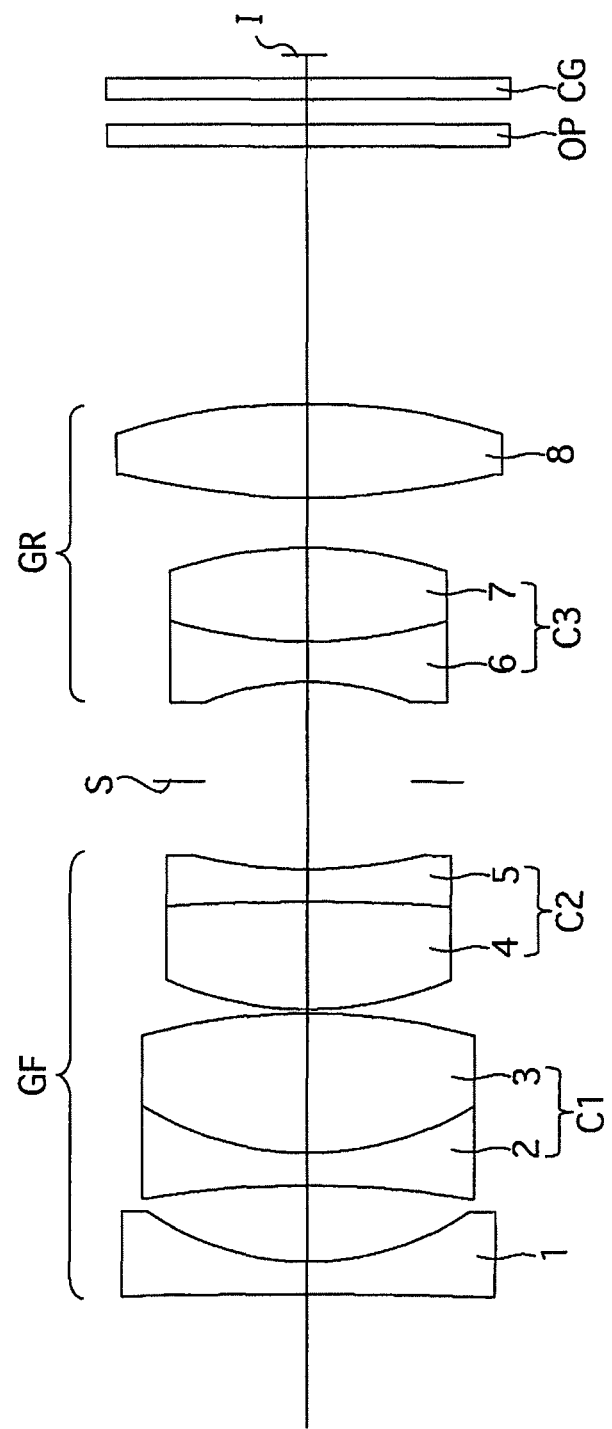
FIG. 10 shows a lens arrangement of a fourth numerical embodiment of a photographing lens system, according to the present invention, when focused on an object at infinity.
Figures 11A, 11B, 11C, 11D:
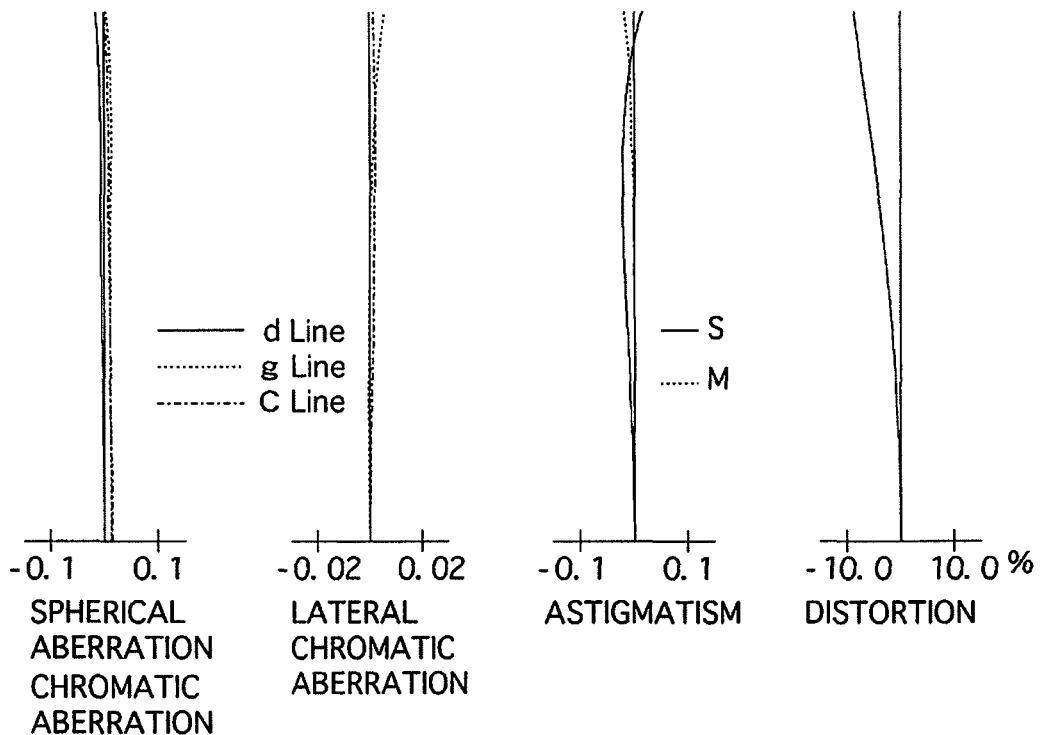
FIGS. 11A, 11B, 11C and 11D show various aberrations that occurred in the lens arrangement shown in FIG. 10.
Figure 12A:
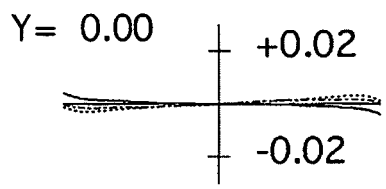
FIGS. 12A, 12B, 12C and 12D show lateral aberrations that occurred in the lens arrangement shown in FIG. 10.
Figure 12B:
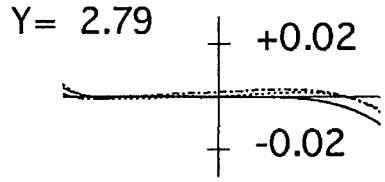
Figure 12C:
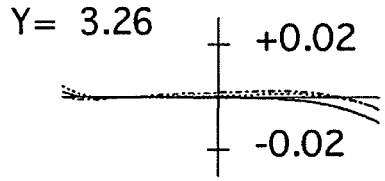
Figure 12D:
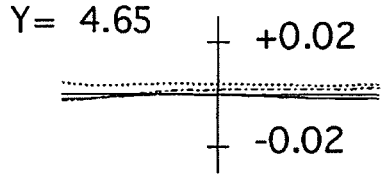

FIGS. 10 through 12D and Tables 10 through 12 show a fourth numerical embodiment of a photographing lens system according to the present invention. FIG. 10 shows a lens arrangement of the fourth numerical embodiment of the zoom lens system when focused on an object at infinity. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. Table 10 shows the lens surface data, Table 11 shows the aspherical surface data, and Table 12 shows various data of the photographing lens system according to the fourth numerical embodiment of the present invention.

The fundamental lens arrangement of the fourth numerical embodiment is the same as that of the second numerical embodiment.

TABLE 10

SURFACE DATA

| Surf. No. | R | d | N(d) | ν(d) |
|---|---|---|---|---|
| 1 | −185.626 | 0.800 | 1.80420 | 46.5 |
| 2 | 7.056 | 1.870 | | |
| 3 | −23.960 | 0.800 | 1.59551 | 39.2 |
| 4 | 7.808 | 3.422 | 1.88300 | 40.8 |
| 5 | −15.577 | 0.100 | | |
| 6 | 8.846 | 2.653 | 1.77250 | 49.6 |
| 7 | −48.559 | 0.800 | 1.58144 | 40.9 |
| 8 | 12.233 | 2.145 | | |
| 9(Diaphragm) | ∞ | 2.435 | | |
| 10 | −6.621 | 1.000 | 1.76182 | 26.6 |
| 11 | 11.577 | 2.300 | 1.75501 | 51.2 |
| 12* | −9.976 | 1.232 | | |
| 13* | 15.612 | 2.322 | 1.72903 | 54.0 |
| 14* | −16.856 | 6.335 | | |
| 15 | ∞ | 0.550 | 1.51680 | 64.2 |
| 16 | ∞ | 0.620 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 11

Aspherical Surface Data

| Surf. No. | K | A4 | A6 | A8 |
|---|---|---|---|---|
| 12 | 0.000 | 0.5306E−04 | 0.1225E−04 | −0.2065E−07 |
| 13 | 0.000 | −0.3359E−03 | 0.2201E−05 | 0.5267E−07 |
| 14 | 0.000 | −0.1177E−03 | −0.4555E−05 | 0.1583E−06 |

TABLE 12

PHOTOGRAPHING LENS SYSTEM DATA

| | |
|---|---|
| FNO. | 1.9 |
| f | 8.5 |
| W | 30.6 |
| Y | 4.65 |
| dB | 0.53 |
| L | 30.42 |

TABLE 13

SURFACE DATA

| Surf. No. | R | d | N(d) | ν(d) |
|---|---|---|---|---|
| 1 | 44.123 | 0.800 | 1.69680 | 55.5 |
| 2 | 5.948 | 2.538 | | |
| 3 | −16.881 | 0.800 | 1.59551 | 39.2 |
| 4 | 8.290 | 4.343 | 1.88300 | 40.8 |
| 5 | −23.576 | 0.100 | | |
| 6 | 8.550 | 2.294 | 1.77250 | 49.6 |
| 7 | −14.546 | 0.800 | 1.59551 | 39.2 |
| 8 | 47.953 | 1.747 | | |
| 9(Diaphragm) | ∞ | 1.891 | | |
| 10 | −7.882 | 0.817 | 1.76182 | 26.6 |
| 11 | 6.300 | 3.180 | 1.75501 | 51.2 |
| 12* | −20.513 | 1.271 | | |
| 13* | 15.599 | 2.109 | 1.80610 | 40.7 |
| 14* | −22.666 | 3.940 | | |
| 15 | ∞ | 0.550 | 1.51680 | 64.2 |
| 16 | ∞ | 2.020 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 14

Aspherical Surface Data

| Surf. No. | K | A4 | A6 | A8 |
|---|---|---|---|---|
| 12 | 0.000 | 0.2481E−03 | 0.2089E−04 | −0.1062E−06 |
| 13 | 0.000 | −0.3323E−03 | 0.5321E−05 | 0.1007E−06 |
| 14 | 0.000 | −0.1224E−03 | −0.4211E−05 | 0.2702E−06 |

TABLE 15

PHOTOGRAPHING LENS SYSTEM DATA

| | |
|---|---|
| FNO. | 1.9 |
| f | 8.5 |
| W | 30.2 |
| Y | 4.65 |
| dB | 0.53 |
| L | 30.23 |

Numerical Embodiment 5

Figure 13:
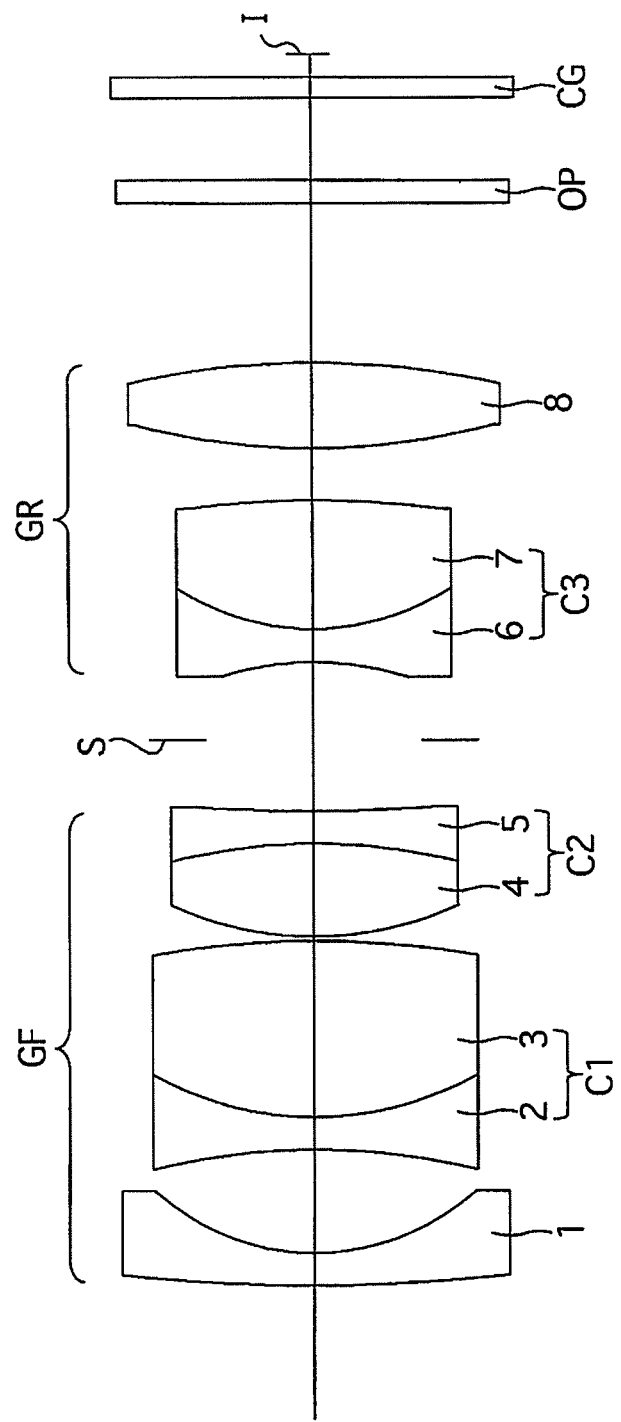
FIG. 13 shows a lens arrangement of a fifth numerical embodiment of a photographing lens system, according to the present invention, when focused on an object at infinity.

FIGS. 13 through 15D and Tables 13 through 15 show a fifth numerical embodiment of a photographing lens system according to the present invention. FIG. 13 shows a lens arrangement of the fifth numerical embodiment of the zoom lens system when focused on an object at infinity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. Table 13 shows the lens surface data, Table 14 shows the aspherical surface data, and Table 15 shows various data of the photographing lens system according to the fifth numerical embodiment of the present invention.

The fundamental lens arrangement of the fifth numerical embodiment is the same as that of the first numerical embodiment.

Numerical Embodiment 6

Figure 16:
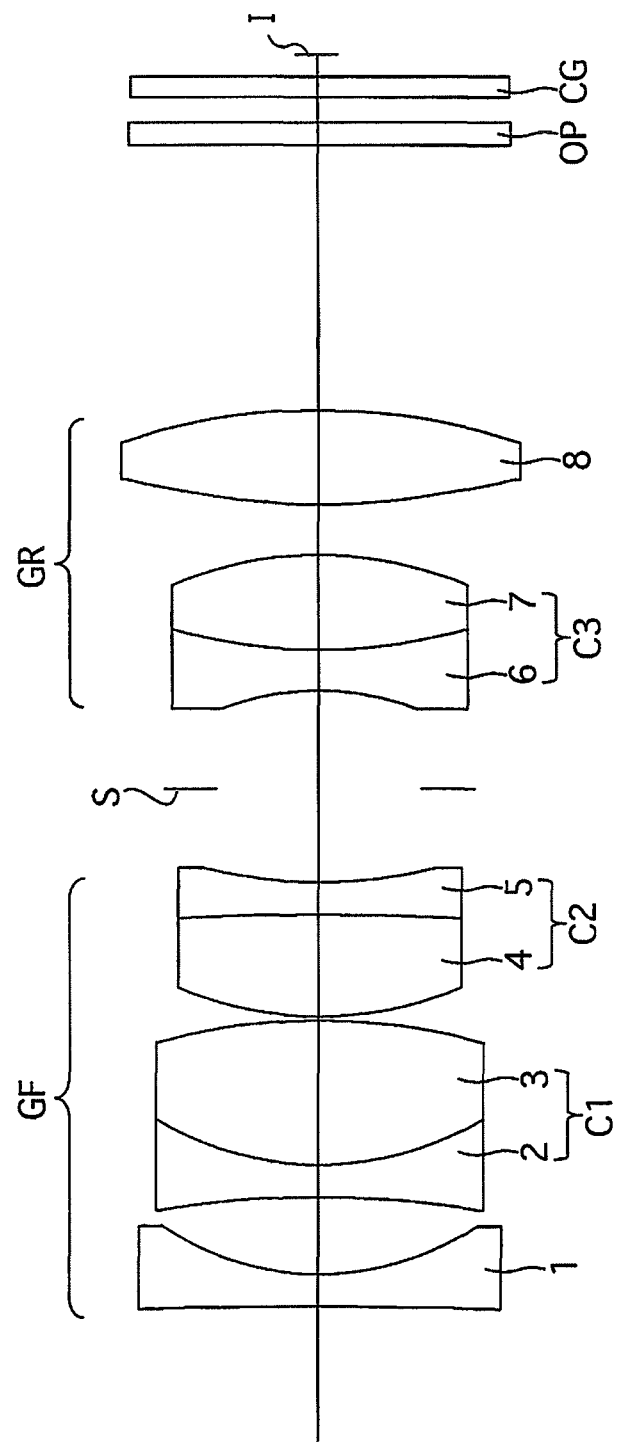
FIG. 16 shows a lens arrangement of a sixth numerical embodiment of a photographing lens system, according to the present invention, when focused on an object at infinity.

FIGS. 16 through 18D and Tables 16 through 18 show a sixth numerical embodiment of a photographing lens system according to the present invention. FIG. 16 shows a lens arrangement of the sixth numerical embodiment of the zoom lens system when focused on an object at infinity. FIGS. 17A, 17B, 17C and 17D show various aberrations that occurred in the lens arrangement shown in FIG. 16. FIGS. 18A, 18B, 18C and 18D show lateral aberrations that occurred in the lens arrangement shown in FIG. 16. Table 16 shows the lens surface data, Table 17 shows the aspherical surface data, and Table shows various data of the photographing lens system according to the sixth numerical embodiment of the present invention.

The fundamental lens arrangement of the sixth numerical embodiment is the same as that of the second numerical embodiment.

TABLE 16

SURFACE DATA

| Surf. No. | R | d | N (d) | ν (d) |
|---|---|---|---|---|
| 1 | −169.547 | 0.800 | 1.80420 | 46.5 |
| 2 | 7.023 | 1.884 | | |
| 3 | −24.406 | 0.800 | 1.59551 | 39.2 |
| 4 | 7.793 | 3.543 | 1.88300 | 40.8 |
| 5 | −15.079 | 0.100 | | |
| 6 | 8.925 | 2.521 | 1.77250 | 49.6 |
| 7 | −59.476 | 0.800 | 1.58144 | 40.9 |
| 8 | 11.999 | 2.286 | | |
| 9 (Diaphragm) | ∞ | 2.391 | | |
| 10 | −6.591 | 1.000 | 1.76182 | 26.6 |
| 11 | 13.278 | 2.334 | 1.69680 | 55.5 |
| 12* | −8.902 | 1.230 | | |
| 13* | 15.516 | 2.318 | 1.72903 | 54.0 |
| 14* | −17.241 | 6.515 | | |
| 15 | ∞ | 0.550 | 1.51680 | 64.2 |
| 16 | ∞ | 0.620 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 17

Aspherical Surface Data

| Surf. No. | K | A4 | A6 | A8 |
|---|---|---|---|---|
| 12 | 0.000 | 0.4509E−04 | 0.1269E−04 | −0.3638E−07 |
| 13 | 0.000 | −0.3303E−03 | 0.1786E−05 | 0.5489E−07 |
| 14 | 0.000 | −0.1389E−03 | −0.4295E−05 | 0.1551E−06 |

TABLE 18

PHOTOGRAPHING LENS SYSTEM DATA

| FNO. | 1.9 |
|---|---|
| f | 8.5 |
| W | 30.6 |
| Y | 4.65 |
| dB | 0.53 |
| L | 30.72 |

TABLE 19

SURFACE DATA

| Surf. No. | R | d | N (d) | ν (d) |
|---|---|---|---|---|
| 1 | 104.823 | 0.800 | 1.65160 | 58.4 |
| 2 | 6.090 | 3.259 | | |
| 3 | −17.678 | 0.800 | 1.59551 | 39.2 |
| 4 | 8.839 | 2.591 | 1.88300 | 40.8 |
| 5 | −23.146 | 0.100 | | |
| 6 | 9.315 | 2.577 | 1.80420 | 46.5 |
| 7 | −14.474 | 0.800 | 1.62004 | 36.3 |
| 8 | 95.055 | 1.552 | | |
| 9 (Diaphragm) | ∞ | 1.800 | | |
| 10 | −8.124 | 0.800 | 1.76182 | 26.6 |
| 11 | 6.147 | 3.097 | 1.65160 | 58.4 |
| 12* | −14.373 | 1.271 | | |
| 13* | 17.877 | 2.017 | 1.88300 | 40.8 |
| 14* | −23.315 | 5.837 | | |
| 15 | ∞ | 0.550 | 1.51680 | 64.2 |
| 16 | ∞ | 0.620 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 20

Aspherical Surface Data

| Surf. No. | K | A4 | A6 | A8 |
|---|---|---|---|---|
| 12 | 0.000 | 0.2232E−03 | 0.1714E−04 | 0.2565E−07 |
| 13 | 0.000 | −0.2522E−03 | 0.2475E−05 | 0.6534E−07 |
| 14 | 0.000 | −0.1420E−03 | −0.3601E−05 | 0.1560E−06 |

TABLE 21

PHOTOGRAPHING LENS SYSTEM DATA

| FNO. | 1.9 |
|---|---|
| f | 8.5 |
| W | 30.6 |
| Y | 4.65 |
| dB | 0.53 |
| L | 29.50 |

Numerical Embodiment 7

Figure 19:
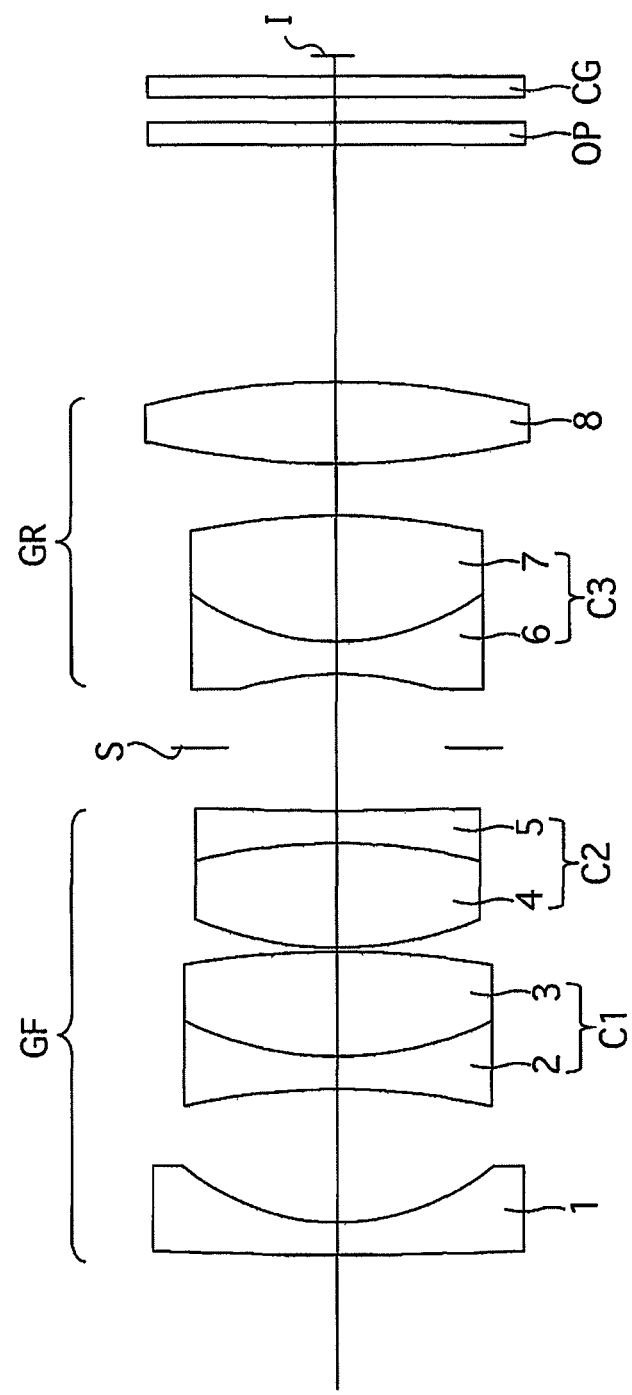
FIG. 19 shows a lens arrangement of a seventh numerical embodiment of a photographing lens system, according to the present invention, when focused on an object at infinity.

FIGS. 19 through 21D and Tables 19 through 21 show a seventh numerical embodiment of a photographing lens system according to the present invention. FIG. 19 shows a lens arrangement of the seventh numerical embodiment of the zoom lens system when focused on an object at infinity. FIGS. 20A, 20B, 20C and 20D show various aberrations that occurred in the lens arrangement shown in FIG. 19. FIGS. 21A, 21B, 21C and 21D show lateral aberrations that occurred in the lens arrangement shown in FIG. 19. Table 19 shows the lens surface data, Table 20 shows the aspherical surface data, and Table 21 shows various data of the photographing lens system according to the seventh numerical embodiment of the present invention.

The fundamental lens arrangement of the seventh numerical embodiment is the same as that of the first numerical embodiment.

Numerical Embodiment 8

Figure 22:
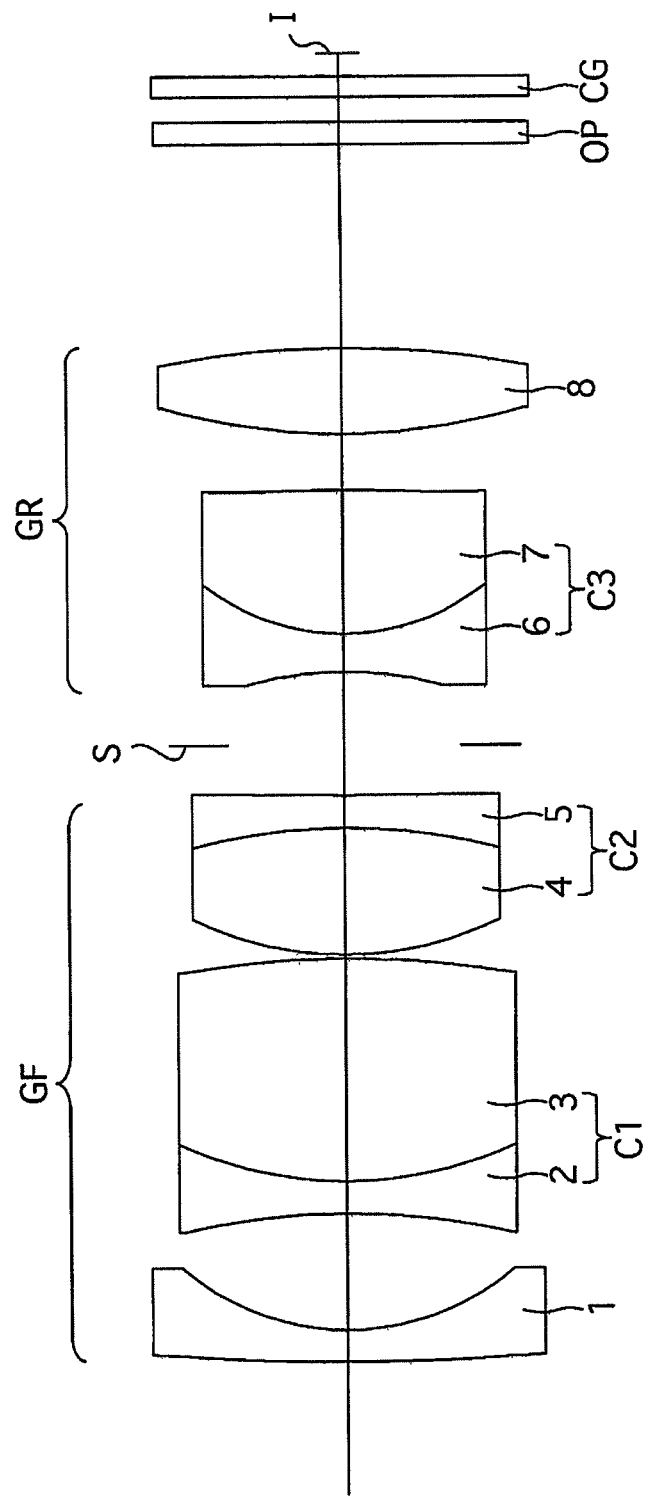
FIG. 22 shows a lens arrangement of an eighth numerical embodiment of a photographing lens system, according to the present invention, when focused on an object at infinity.
Figures 23A, 23B, 23C, 23D:
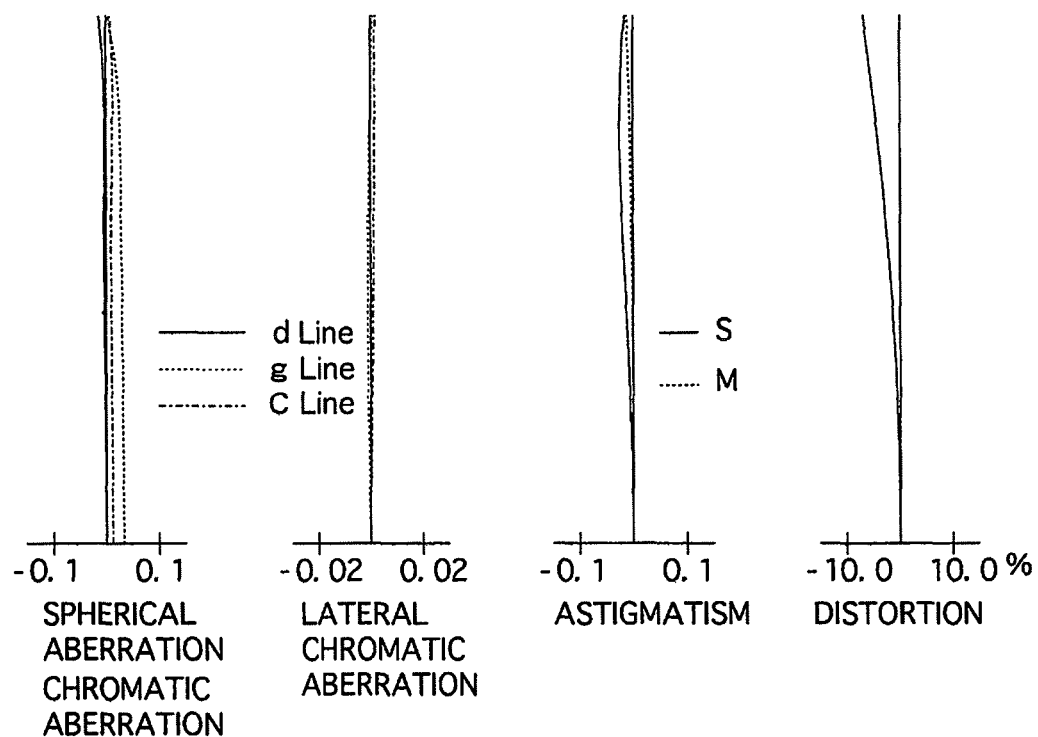
FIGS. 23A, 23B, 23C and 23D show various aberrations that occurred in the lens arrangement shown in FIG. 22.
Figure 24A:
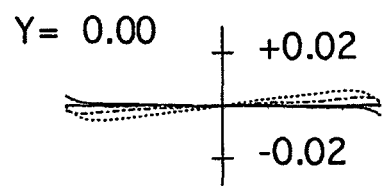
FIGS. 24A, 24B, 24C and 24D show lateral aberrations that occurred in the lens arrangement shown in FIG. 22.
Figure 24B:
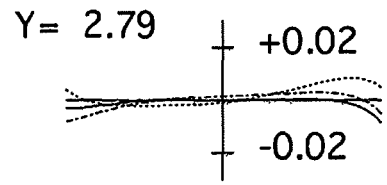
Figure 24C:
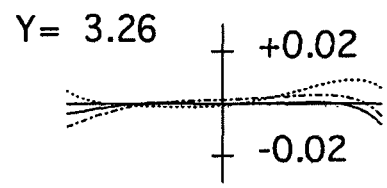
Figure 24D:
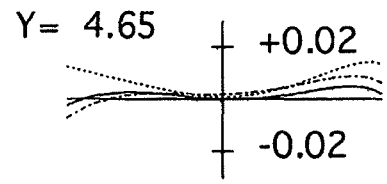

FIGS. 22 through 24D and Tables 22 through 24 show an eighth numerical embodiment of a photographing lens system according to the present invention. FIG. 22 shows a lens arrangement of the eighth numerical embodiment of the zoom lens system when focused on an object at infinity. FIGS. 23A, 23B, 23C and 23D show various aberrations that occurred in the lens arrangement shown in FIG. 22. FIGS. 24A, 24B, 24C and 24D show lateral aberrations that occurred in the lens arrangement shown in FIG. 22. Table 22 shows the lens surface data, Table 23 shows the aspherical surface data, and Table 24 shows various data of the photographing lens system according to the eighth numerical embodiment of the present invention.

The fundamental lens arrangement of the eighth numerical embodiment is the same as that of the first numerical embodiment.

TABLE 22

SURFACE DATA

| Surf. No. | R | d | N (d) | ν (d) |
|---|---|---|---|---|
| 1 | 60.952 | 0.800 | 1.69680 | 55.5 |
| 2 | 6.340 | 2.841 | | |
| 3 | −17.785 | 0.800 | 1.59551 | 39.2 |
| 4 | 10.006 | 5.450 | 1.88300 | 40.8 |
| 5 | −24.662 | 0.100 | | |
| 6 | 8.651 | 3.127 | 1.77250 | 49.6 |
| 7 | −14.882 | 0.800 | 1.59551 | 39.2 |
| 8 | 247.553 | 1.222 | | |
| 9 (Diaphragm) | ∞ | 1.800 | | |
| 10 | −9.067 | 0.936 | 1.76182 | 26.6 |
| 11 | 5.614 | 3.526 | 1.75501 | 51.2 |
| 12* | −54.579 | 1.390 | | |
| 13* | 14.110 | 2.126 | 1.80610 | 40.7 |
| 14* | −27.416 | 4.985 | | |
| 15 | ∞ | 0.550 | 1.51680 | 64.2 |
| 16 | ∞ | 0.620 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 23

Aspherical Surface Data

| Surf. No. | K | A4 | A6 | A8 |
|---|---|---|---|---|
| 12 | 0.000 | 0.2843E−03 | 0.2922E−04 | −0.3328E−06 |
| 13 | 0.000 | −0.3866E−03 | 0.7369E−05 | 0.8788E−07 |
| 14 | 0.000 | −0.1519E−03 | −0.5426E−05 | 0.3112E−06 |

TABLE 24

PHOTOGRAPHING LENS SYSTEM DATA

| | |
|---|---|
| FNO. | 1.9 |
| f | 8.5 |
| W | 30.5 |
| Y | 4.65 |
| dB | 0.53 |
| L | 32.10 |

Numerical Embodiment 9

Figure 25:
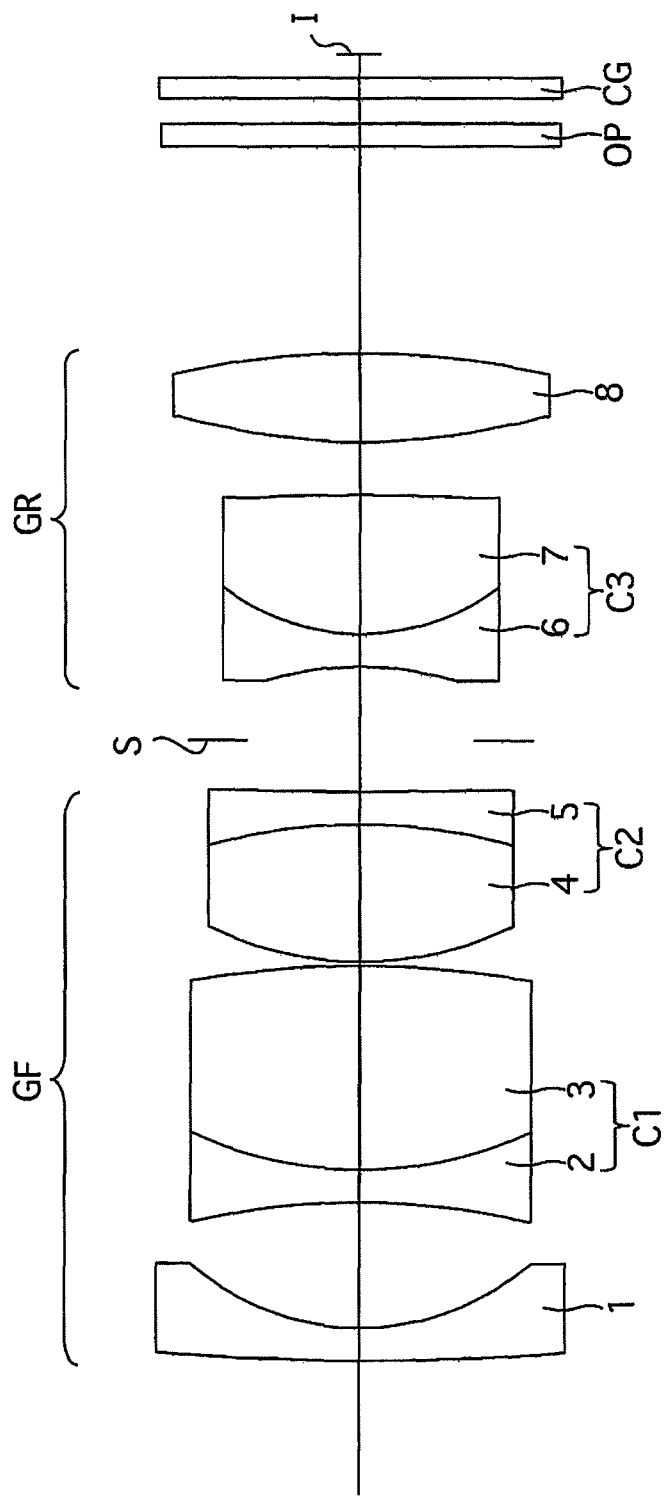
FIG. 25 shows a lens arrangement of a ninth numerical embodiment of a photographing lens system, according to the present invention, when focused on an object at infinity.

FIGS. 25 through 27D and Tables 25 through 27 show a ninth numerical embodiment of a photographing lens system according to the present invention. FIG. 25 shows a lens arrangement of the ninth numerical embodiment of the zoom lens system when focused on an object at infinity. FIGS. 26A, 26B, 26C and 26D show various aberrations that occurred in the lens arrangement shown in FIG. 25. FIGS. 27A, 27B, 27C and 27D show lateral aberrations that occurred in the lens arrangement shown in FIG. 25. Table 25 shows the lens surface data, Table 26 shows the aspherical surface data, and Table 27 shows various data of the photographing lens system according to the ninth numerical embodiment of the present invention.

The fundamental lens arrangement of the ninth numerical embodiment is the same as that of the first numerical embodiment.

TABLE 25

SURFACE DATA

| Surf. No. | R | d | N (d) | ν (d) |
|---|---|---|---|---|
| 1 | 62.928 | 0.800 | 1.69680 | 55.5 |
| 2 | 6.395 | 3.089 | | |
| 3 | −18.134 | 0.800 | 1.59551 | 39.2 |
| 4 | 10.028 | 5.000 | 1.88300 | 40.8 |
| 5 | −24.786 | 0.100 | | |
| 6 | 8.659 | 3.378 | 1.77250 | 49.6 |
| 7 | −14.254 | 0.800 | 1.59551 | 39.2 |
| 8 | 130.121 | 1.240 | | |
| 9 (Diaphragm) | ∞ | 1.808 | | |
| 10 | −8.493 | 0.800 | 1.76182 | 26.6 |
| 11 | 5.628 | 3.439 | 1.75501 | 51.2 |
| 12* | −40.577 | 1.297 | | |
| 13* | 14.756 | 2.170 | 1.80610 | 40.7 |
| 14* | −23.985 | 5.088 | | |
| 15 | ∞ | 0.550 | 1.51680 | 64.2 |
| 16 | ∞ | 0.620 | | |
| 17 | ∞ | 0.500 | 1.51680 | 64.2 |
| 18 | ∞ | — | | |

The asterisk (*) designates an aspherical surface which is rotationally symmetrical with respect to the optical axis.

TABLE 26

Aspherical Surface Data

| Surf. No. | K | A4 | A6 | A8 |
|---|---|---|---|---|
| 12 | 0.000 | 0.3135E−03 | 0.2607E−04 | −0.2321E−06 |
| 13 | 0.000 | −0.3426E−03 | 0.6564E−05 | 0.6307E−07 |
| 14 | 0.000 | −0.1363E−03 | −0.4885E−05 | 0.2545E−06 |

TABLE 27

PHOTOGRAPHING LENS SYSTEM DATA

| | |
|---|---|
| FNO. | 1.9 |
| f | 8.5 |
| W | 30.5 |
| Y | 4.65 |
| dB | 0.53 |
| L | 32.01 |

The numerical values of each condition for each embodiment are shown in Table 28.

TABLE 28

| | Embod. 1 | Embod. 2 | Embod. 3 |
|---|---|---|---|
| Cond. (1) | 1.44 | 0.40 | 0.62 |
| Cond. (2) | −1.35 | −1.10 | −1.06 |
| Cond. (3) | 24.6 | 24.6 | 24.6 |
| Cond. (4) | 40.7 | 40.7 | 40.7 |

| | Embod. 4 | Embod. 5 | Embod. 6 |
|---|---|---|---|
| Cond. (1) | 1.49 | 0.45 | 1.48 |
| Cond. (2) | −0.99 | −1.17 | −0.98 |
| Cond. (3) | 24.6 | 24.6 | 28.85 |
| Cond. (4) | 54.0 | 40.7 | 54.0 |

| | Embod. 7 | Embod. 8 | Embod. 9 |
|---|---|---|---|
| Cond. (1) | 0.59 | 0.38 | 0.88 |
| Cond. (2) | −1.17 | −1.20 | −1.21 |
| Cond. (3) | 31.8 | 24.6 | 24.6 |
| Cond. (4) | 40.8 | 40.7 | 40.7 |

As can be understood from Table 28, the first through ninth numerical embodiments satisfy conditions (1) through (4).

Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A photographing lens system comprising a positive front lens group, an aperture diaphragm, and a positive rear lens group, in that order from the object side,
    wherein said front lens group includes at least one negative lens element, and at least two positive cemented lenses, in that order from the object side, and
    wherein the following conditions (1) and (2) are satisfied:

$$0.35 < fF/fR < 1.5 \qquad (1),$$

and $$-1.4 < fL1/f < -0.9 \qquad (2),$$

wherein
    fF designates the focal length of said front lens group;
    fR designates the focal length of said rear lens group;
    fL1 designates the combined focal length of said at least one negative lens element provided within said front lens group; and
    f designates the focal length of the entire said photographing lens system.

2. The photographing lens system according to claim 1, wherein said rear lens group comprises a negative cemented lens and a positive lens element, in that order from the object side.

3. The photographing lens system according to claim 2, wherein the negative cemented lens which is provided within said rear lens group comprises a negative lens element and a positive lens element, in that order from the object side, and
    wherein the following condition (3) is satisfied:

$$|vd6 - vd7| > 20 \qquad (3),$$

wherein
    vd6 designates the Abbe number with respect to the d-line of the negative lens element of the negative cemented lens which is provided within said rear lens group; and
    vd7 designates the Abbe number with respect to the d-line of the positive lens element of the negative cemented lens which is provided within said rear lens group.

4. The photographing lens system according to claim 2, wherein a positive lens element which is provided closest to the image side within said rear lens group comprises a focusing lens group which is moved along the optical axis direction during a focusing operation.

5. The photographing lens system according to claim 4, wherein the following condition (4) is satisfied:

$$vd8 > 40 \qquad (4),$$

wherein
    vd8 designates the Abbe number with respect to the d-line of the positive lens element which is provided closest to the image side within said rear lens group.

6. The photographing lens system according to claim 1, wherein said front lens group comprises a negative lens element having a concave surface on the image side, and two positive cemented lenses, in that order from the object side.

7. The photographing lens system according to claim 6, wherein the cemented lens that is provided on the object side within said front lens group comprises a negative lens element having a concave surface on the object side and a positive lens element, in that order from the object side.

8. The photographing lens system according to claim 6, wherein the cemented lens provided on the image side within said front lens group comprises a positive lens element having a convex surface on the object side and a negative lens element having a concave surface on the image side, in that order from the object side.

9. A photographing lens system comprising a positive front lens group, an aperture diaphragm, and a positive rear lens group, in that order from the object side,
    wherein said front lens group includes one negative lens element and two positive cemented lenses, in that order from the object side, and
    wherein said rear lens group consists of a negative cemented lens and one positive lens element, in that order from the object side.

10. A photographing lens system comprising a positive front lens group, an aperture diaphragm, and a positive rear lens group, in that order from the object side,
    wherein said photographing lens system is arranged to be used in a mirrorless interchangeable-lens camera,
    wherein said front lens group includes at least one negative lens element, and at least two positive cemented lenses, in that order from the object side, and
    wherein the following conditions (1) and (2) are satisfied:

$$0.35 < fF/fR < 1.5 \qquad (1),$$

and $$-1.4 < fL1/f < -0.9 \qquad (2),$$

wherein
    fF designates the focal length of said front lens group;
    fR designates the focal length of said rear lens group;
    fL1 designates the combined focal length of said at least one negative lens element provided within said front lens group; and
    f designates the focal length of the entire said photographing lens system.

* * * * *